United States Patent
Seto et al.

[11] Patent Number: 6,107,761
[45] Date of Patent: *Aug. 22, 2000

[54] DRIVE FOR ELECTRIC VEHICLE AND CONTROL METHOD OF THE SAME

[75] Inventors: Takeshi Seto; Akihito Uetake; Tatsuya Shimoda, all of Nagano; Masao Ono, Kanagawa; Masatoshi Fukuda, Kanagawa; Satoshi Yamazaki, Kanagawa, all of Japan

[73] Assignees: Seiko Epson Corporation; Tokyo R&D Co., Ltd., both of Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/788,642

[22] Filed: Jan. 27, 1997

[30] Foreign Application Priority Data

Jan. 26, 1996 [JP] Japan .................................... 8-012222

[51] Int. Cl.[7] ...................................................... H02P 1/00
[52] U.S. Cl. ........................... 318/139; 318/432; 318/376; 180/179; 180/343; 475/5
[58] Field of Search ..................................... 310/362, 382, 310/139; 180/170–179, 337–338, 342–343; 475/2–9

[56] References Cited

U.S. PATENT DOCUMENTS

| | | | |
|---|---|---|---|
| 4,096,418 | 6/1978 | Marumoto et al. | 318/12 |
| 4,361,788 | 11/1982 | Melocik | 318/341 |
| 4,471,273 | 9/1984 | Melocik et al. | 318/55 |
| 4,518,902 | 5/1985 | Melocik et al. | 318/373 |
| 5,289,890 | 3/1994 | Toyoda et al. | 318/139 |
| 5,512,022 | 4/1996 | Suzuki | 475/5 |
| 5,575,730 | 11/1996 | Edwards et al. | 475/5 |
| 5,804,935 | 8/1998 | Radev | 318/139 |

*Primary Examiner*—David Martin
*Attorney, Agent, or Firm*—Kanesaka & Takeuchi

[57] ABSTRACT

A drive for an electric vehicle includes by forming a drive unit 8 having a transmission by combining a single propelling motor 7 with the transmission, respectively interconnecting the drive unit 8 with propelling wheels to be a drive wheel, and separately controlling the drive units 8. Besides, traveling speed detecting means are provided on the respective drive units 8, 8, and the respective drive units are simultaneously controlled according to a revolution signal from one of the traveling speed detecting means. A method for controlling an electric vehicle by separately controlling the drive units 8, 8, making the output torque of the motor zero or minimum during the gear change, and producing again the output torque of the motor after completing the gear change.

12 Claims, 13 Drawing Sheets

DRIVE FOR ELECTRIC VEHICLE AND CONTROL METHOD OF THE SAME

BACKGROUND OF THE INVENTION

1. Field of the Invention

The present invention relates to an electric vehicle provided with a propelling motor which is driven by a battery power source, and particularly to a drive for driving an electric vehicle and a method for controlling the same.

2. Description of Prior Art

As a next-generation alternative vehicle for internal combustion engine vehicles such as gasoline automobiles, an electric vehicle using a propelling motor is attracting attention these years. It is said that the electric vehicle which uses a clean electric energy can completely remedy the environmental problems such as harmful noises and exhaust gases, which are about 70% of the causes for the environmental pollution, derived from the internal combustion engine vehicles, and can extend by two times or more the resource life of fossil fuel such as petroleum.

The electric vehicle has propelling wheels suspended by a shock absorber from the vehicle body in the same way as a conventional gasoline automobile and is propelled by a power transmission device with a motor as the drive source. And, the motor has electric power supplied by an electric power supply.

This electric power unit comprises a battery power supply unit using a plurality of storage batteries, a power supply circuit for supplying stable electric power, a motor for propelling, a motor driving circuit for directly controlling the propelling power of the motor, and a control circuit for outputting an operation command or the like to the motor drive circuit. And, the motor-driven power from the motor is transmitted to the propelling wheels via a power transmission to drive the vehicle.

Such a power transmission is known to use the one which is used for a conventional gasoline automobile and a single propelling motor 52 is provided instead of an engine as shown in FIG. 13. A power transmission 51 of an electric vehicle 50 comprises a transmission 53 directly connected to the motor 52 which is provided at the front of the vehicle, a propeller shaft 54 which is connected to the transmission 53 to transmit the drive force backward, and a differential gear 57 for distributing the drive force to a rear axle 56 to which rear right and left wheels 55, 55 are connected. And, the motor power is lowered by the transmission 53 to drive the rear wheels 55, 55. It is also known to directly connect the motor 52 to the propeller shaft 54 with the transmission 53 omitted, and to directly connect the motor 52 to the differential gear into one body with the propeller shaft also omitted.

And, it is also known to omit a speed reducer and a transmission mechanism and to incorporate a motor into the right and left wheels to provide a direct drive system to directly drive the right and left wheels by each motor.

Besides, such an electric vehicle generally uses a regeneration brake in addition to a common mechanical brake, differing from the conventional gasoline automobile. The regeneration brake temporarily uses the propelling motor as a generator at the time of reducing the speed of the vehicle when the brake is activated, converts the motion energy to be reduced for decelerating the vehicle into the electric energy by the motor generation, and recovers the obtained electric energy into the storage batteries.

Therefore, as compared with the mechanical brake utilizing a frictional braking force owing to a physical contact, the regeneration brake utilizes a non-contact, electromagnetic braking force, so that degradation of the braking force due to heating at frictional braking and lowering of the performance due to friction can be avoided, and reliability and durability of the braking device are improved. And, by the regeneration brake, the deceleration performance similar to the acceleration performance by the motor can be obtained in principle, and electricity generated by the motor can be controlled by electrically controlling, so that a regeneration braking force can be set and controlled arbitrarily.

However, since a general electric vehicle uses a single propelling motor to distribute the motor-driven force to respective wheels through a mechanical transmission mechanism, it has a disadvantage that a transmission, a propeller shaft and a differential gear which form the transmission mechanism are made large. And, since these rotary parts have a high inertia moment, energy required for acceleration is increased, and the transmission efficiency of the motor-driven force is lowered.

And, since the vehicle space is largely occupied by the above members, there are disadvantages that the vehicle appearance is adversely effected, and flexibility of designing the vehicle body is limited.

Besides, since the direct driving does not have a transmission, the motor's low efficient zone is used depending on a broad traveling speed range of the vehicle, resulting in a disadvantage that the motor efficiency is lowered. Especially, when the vehicle is traveling at a low speed, this tendency is prominent and a high-power motor is needed, so that the motor size becomes large and the total performance is lowered.

Furthermore, the vehicle having a transmission needs to accurately detect a traveling speed of the vehicle to operate the transmission in order to change the speed, and it is general to obtain the traveling speed from the revolving speeds of the propelling wheels. But, since the propelling wheels slip depending on a traveling condition, it is hard to detect the actual traveling speed based on the revolving speeds of the propelling wheels.

SUMMARY OF THE INVENTION

Accordingly, the present invention aims to provide a drive for an electric vehicle having a propelling motor driven by a battery power which can improve the transmission efficiency of a motor drive force, increase the flexibility of designing a car body, prevent the motor efficiency from being lowered and use a small motor, and a method for controlling the same.

According to one aspect of the invention there is provided an electric vehicle which is provided with a motor for propelling driven by a battery power supply and a transmission for changing the revolution output from the motor, and controls the motor according to an instruction signal from a control, wherein a drive for the electric vehicle is characterized by forming a drive unit having a transmission by combining a single propelling motor with the transmission, respectively interconnecting the drive unit having the transmission with propelling wheels to be a drive wheel, and separately controlling the drive units having the transmission.

By configuring as described above, since a space required for the drive force transmission mechanism is small, a space for providing other components of the electric vehicle can be made large. Therefore, designing can be made rather freely. Besides, since the drive wheels are driven independently, the distribution of torque to each drive wheel can be varied freely.

According to another aspect of the invention there is provided a drive for the electric vehicle according to the above aspect of the invention, wherein the respective drive units are driven according to a single instruction signal from the control.

Therefore, since each drive unit is driven according to a single instruction signal, the drives by the respective drive units can be uniformized to provide stable operation and secure sufficient safety. And, it is very suitable for a four-wheel drive-car.

According to still another aspect of the invention there is provided an electric vehicle which is provided with a motor for propelling driven by a battery power supply and a transmission for changing the revolution output from the motor, and controls the motor according to an instruction signal from a control, wherein a drive for the electric vehicle is characterized by forming a drive unit having a transmission by combining a single propelling motor with the transmission, respectively interconnecting the drive unit having the transmission with propelling wheels to be a drive wheel, separately controlling the drive units having the transmission according to an instruction signal from the control, further providing traveling speed detecting means on the respective drive units, and simultaneously controlling the respective drive units according to a revolution signal from one of the traveling speed detecting means.

By configuring as described above, even when traveling speeds obtained from the plurality of drive units are different owing to changes of road surface conditions due to a bad road, weather or the like, or unbalanced air pressures in the tires, all drive units can be operated simultaneously for gear changing based on a certain speed signal to provide the stable operation, so that a sufficient safety can be secured.

Besides, the gear change of all drive units can be started at the same time, and the output operation of all drive units can be restarted after the completion of the gear change of all drive units, so that the traveling balance is prevented from being varied before and after the gear changing.

According to yet another aspect of the invention there is provided a drive for the electric vehicle according to the above still aspect of the invention, wherein when the speed change by the drive unit is the shift-up, a slower revolution signal is adopted among the revolution signals, and when it is the shift-down, a faster revolution signal is adopted among the revolution signals.

Specifically, in the case of shifting to a higher gear, namely from a low-speed gear position to a high-speed gear position, the vehicle is accelerating and it is considered that slipping takes place due to over-revolution when the revolving propelling wheels are faster, and a slower traveling speed is selected; and in the case of shifting to a lower gear, namely from a high-speed gear position to a low-speed gear position, the vehicle is decelerating and it is considered that a propelling wheel which revolves slower slips because it cannot adhere to the ground due to a wheel lock or the like, and a faster traveling speed is selected. Therefore, since accurate control is made according to an actual traveling condition, traveling can be made smoothly, and safety can be secured. And, when a plurality of traveling speeds detected are different, the shift-up is judged based on a slower traveling speed, and the shift-down is judged based on a faster traveling speed, and at the time of judging the shift-up or shift-down, different standards are provided, so that the hysteresis property of the gear-change operation can be enhanced and secured.

According to another aspect of the invention there is provided a drive for the electric vehicle according to the above aspect of the invention, wherein brake operation detecting means for detecting the operation of a brake are provided, and when a brake operation signal from the brake operation detecting means is sent, the shift-down operation of the gear change in the drive unit is canceled.

Specifically, when the gear-change is made while the regeneration brake is being operated, the connection between the drive wheels and the motors is disengaged when gear-changing and the regeneration brake does not function, so that the vehicle needs a longer distance to stop and the effectiveness of the regeneration brake may be varied while braking. Meanwhile, according to the invention described above, when the regeneration brake is being operated, the connected state between the motors and the drive wheels is kept and the operation of the regeneration brake is retained by canceling the gear-changing operation, so that safety and braking performance can be improved. Thus, the braking distance can be kept normal and the effectiveness of the regeneration brake can be stabilized, particularly panic braking can be dealt with at the time of emergency, so that sufficient safety can be secured.

According to still another aspect of the invention there is provided a drive for the electric vehicle, wherein a speed sensor is provided on four propelling wheels, and the respective drive units are simultaneously controlled by a signal from one of the speed sensors.

Therefore, larger amounts of speed information can be obtained and accuracy of speed information can be enhanced, so that reliability of judging the gear change can be improved, stable braking can be made, and sufficient safety can be secured.

According to yet another aspect of the invention there is provided a drive for the electric vehicle, wherein a speed sensor is provided on for propelling wheels, calculating means are provided to obtain an average value of speed information from the speed sensors, speed comparing means are provided to compare the average value obtained by the calculating means with speed information from the respective speed sensors, and the speed comparing means delete a value most different from the average value of the traveling speeds.

Specifically, among traveling speed data obtained from the four propelling wheels, an abnormal value most different from their average value is deleted, so that even when one of the propelling wheels is heavily deviated from the normal revolving state due to some circumstance or cause, the abnormal traveling speed value based on the pertinent propelling wheel is eliminated to prevent the gear change judgment from being made based on the abnormal value, and reliability of detecting the speed can be improved. And, after deleting the abnormal value, according to the traveling condition of shifting up or shifting down the vehicle, the most reliable value at which the wheels are assumed not slipping is selected to judge the gear change. As a result, the gear change judgment can be made accurately, and the traveling performance and safety of the vehicle can be improved.

According to another aspect of the there is provided a drive for the electric vehicle, wherein motor consumption electric current detecting means are provided to detect an electric current to be consumed by the motor, motor speed detecting means are provided to detect the number of revolutions of the motor, comparing and judging means are provided to calculate the detected electric current and the number of revolutions for comparison and judgment, and when it is judged by the comparing and judging means that a propelling wheel is slipping, a revolution signal from the traveling speed detecting means of the pertinent drive unit is canceled.

Thus, it is detected that the motor consumption current does not conform with the motor speed owing to the motor consumption current to detect that a slip takes place, so that the slip can be judged sensorless without using a dedicated slip detecting device and the traveling reliability can be improved.

And, in addition to the slip which is caused due to the driver's operation error or traveling environmental conditions, a slip due to a trouble in the power supply system or control circuit system can be identified, and safety can be improved. Furthermore, in case of troubles in both systems at the same time or a failure due to the combined cause resulting from the simultaneous malfunction of the systems, judgment can be made, and safety can be secured with higher reliability.

According to still another aspect of the invention there is provided a drive for the electric vehicle, wherein the driving of the drive unit can be alternatively selected into an automatic speed change mode and a manual operation mode.

By configuring as described above, in the manual operation mode, the driver's intention can be accurately incorporated in the speed-change operation, so that the driver can enjoy the drive feeling, and the sport driving can be dealt with. And, when the automatic speed-change mode is not in a good condition in view of its program software or function or cannot conform with a traveling circumstance, the manual mode can deal with it.

According to yet another aspect of the invention there is provided a drive for the electric vehicle, wherein the transmission is provided with an electromagnetic clutch.

By configuring as described above, additional equipment such as a hydraulic actuator essential for the mechanical clutch in a conventional automatic transmission is not needed, so that the drive can be made compact and lightweighted. And, since the speed-change operation by the electromagnetic clutch is directly performed by an electrical signal, the speed-change operation can be coordinated with the motor drive control such as the revolving timing of the propelling motor.

According to another aspect of the invention there is provided a method for controlling an electric vehicle which is provided with a motor for propelling driven by a battery power supply and a transmission for changing the revolution output from the motor, and controls the motor according to an instruction signal from a control, wherein a drive for the electric vehicle is characterized by forming a drive unit having a transmission by combining a single propelling motor with the transmission, respectively interconnecting the drive unit having the transmission with propelling wheels to be a drive wheel, separately controlling the drive units having the transmission according to an instruction signal from the control, making the output torque of the motor zero or minimum during the gear change, and producing again the output torque of the motor after completing the gear change.

Thus, by falling the motor in the revolution keeping state for keeping the revolution speed immediately before or in the free-run state without supplying the electric power to the motor, the output torque from the motor is made zero or minimized to facilitate the releasing of the engagement and the connection after that. And, since the release of engagement and the connection are made smoothly, traveling can be made without deteriorating the driving balance among respective drive units.

According to still another aspect of the invention there is provided a method for controlling an electric vehicle, wherein in the manual operation, when the gear change in one drive unit has completed, the output torque of the motor is produced.

Therefore, since it is designed that when a certain drive unit completes the gear-change, the output operation from the pertinent drive unit is made immediately, the clutch operation of the other drive units is disabled and the transmission of the motor-driven force can not be made, but temporary traveling can be made by the drive unit which can operate normally. In other words, when at least one drive unit can operate, the vehicle's traveling function can be prevented from being lost completely, so that safety can be improved.

According to yet another aspect of the invention there is provided a method for controlling an electric vehicle, wherein when the vehicle is still and the gear change in one drive unit has completed, the output torque of the motor is produced.

By configuring as described above, when the vehicle starts from its stationary state, a certain drive unit has completed the clutch connection, upon which this drive unit operates to provide power to move the vehicle even slightly, so that a rotational difference is produced between the connected and non-connected clutches of the other drive units which have not been connected, the engagement of the clutches is facilitated, quick start can be made, and the clutch engaging performance at starting can be improved.

According to another aspect of the invention there is provided a method for controlling an electric vehicle, wherein a speed difference is provided between claw gears in order to make the gear change.

Thus, since the speed difference is provided between the gears to be engaged, reliability of engagement can be improved.

According to another aspect of the invention there is provided an electric vehicle which is provided with a motor for propelling driven by a battery power supply and a transmission for changing the revolution output from the motor, and controls the motor according to an instruction signal from a control, wherein a drive for the electric vehicle is characterized by forming a drive unit having a transmission by combining a single propelling motor with the transmission, respectively interconnecting the drive unit having the transmission with propelling wheels to be a drive wheel, separately controlling the drive units having the transmission according to an instruction signal from the control, further providing a regeneration braking device and wheel lock detecting means on the respective drive units to control a regeneration braking level according to a wheel lock detection signal from the wheel lock detecting means.

Therefore, at the time of operating the regeneration brake, when the revolution of the propelling wheels is locked by the regeneration braking force which is excessive owing to the traveling conditions, the braking level of the regeneration brake is controlled to be reduced, and therefore, the wheel lock is released to prevent a slip from occurring.

And, since the regeneration braking level is controlled according to the wheel lock detection signal from the wheel lock detecting means, the regeneration brake is operated normally. Thus, the optimum braking distance can be secured, and the braking distance can be shortened.

Furthermore, since the operation of respective drive units can be controlled independently, the wheel lock can be detected and released by each drive unit separately, and a slip can be prevented with reliability.

DESCRIPTION OF THE PREFERRED EMBODIMENT

Figure 1:
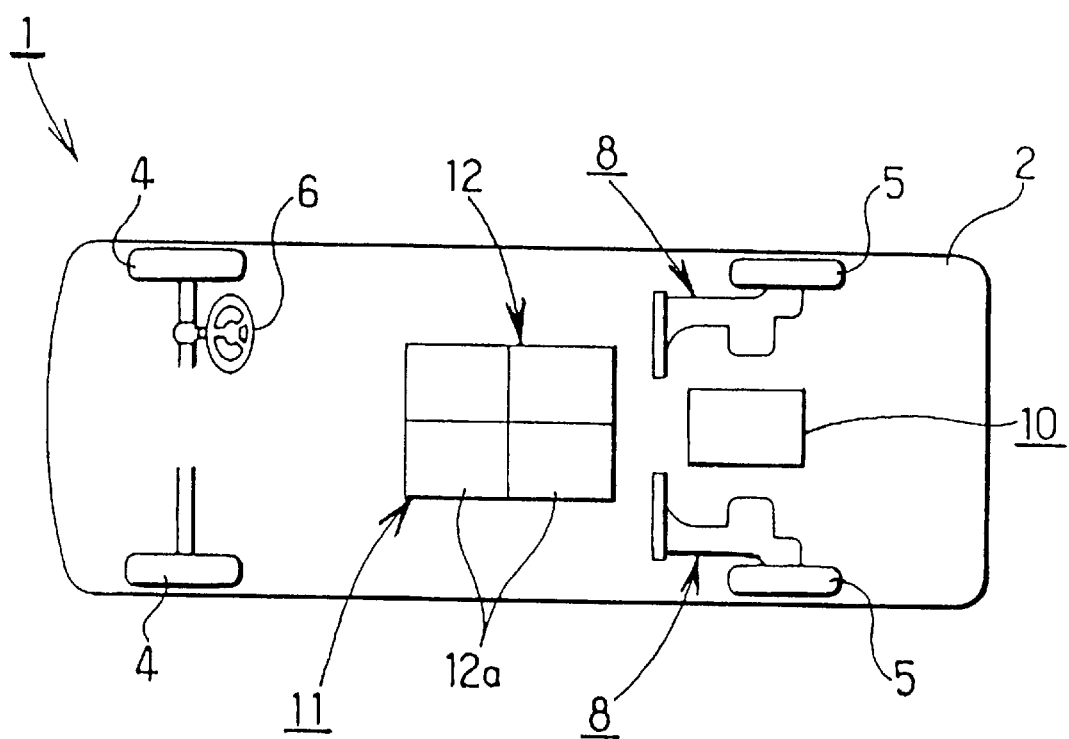
FIG. 1 is a plan view of the whole configuration for showing an electric-motor four-wheel car which is one example of the electric vehicle according to the invention.

Now, the invention will be described with reference to respective embodiments shown in FIG. 1 through FIG. 12. The electric vehicle of the respective embodiments will be described with reference to an electric four-wheel car, one type of electric vehicles, as shown in FIG. 1. And, the basic configuration of the four-wheel car to be described is same through respective embodiments to be described afterward.

An electric vehicle 1 has a vehicle body 2, propelling wheels suspended from the main frame of the vehicle body, namely front wheels 4 and rear wheels 5, at the front and rear of the vehicle body 2 in the same way as a conventional gasoline car driven by an internal combustion engine, and the front wheels 4 are steered by a steering wheel 6. The rear wheels 5 are different from those of the conventional car and driven by independent drive units 8 which have a propelling motor 7, respectively. And, between these drive units 8, a control 10 for controlling the operation of the drive units 8 is disposed, and at the center of the vehicle body 2, an electric power unit 11 is mounted. Electric power is supplied from the electric power unit 11 to the drive units 8 and the control 10.

The electric power unit 11 mainly comprises a battery power supply 12 and has a residual capacity meter, a power circuit and others which are not illustrated. The battery power supply 12 has a group of storage batteries 12a, 12a fixed to the vehicle body by brackets, and these storage batteries 12a are mutually connected in series through a cable not having a high electric power transmission loss so that a prescribed voltage can be obtained.

Figure 2:
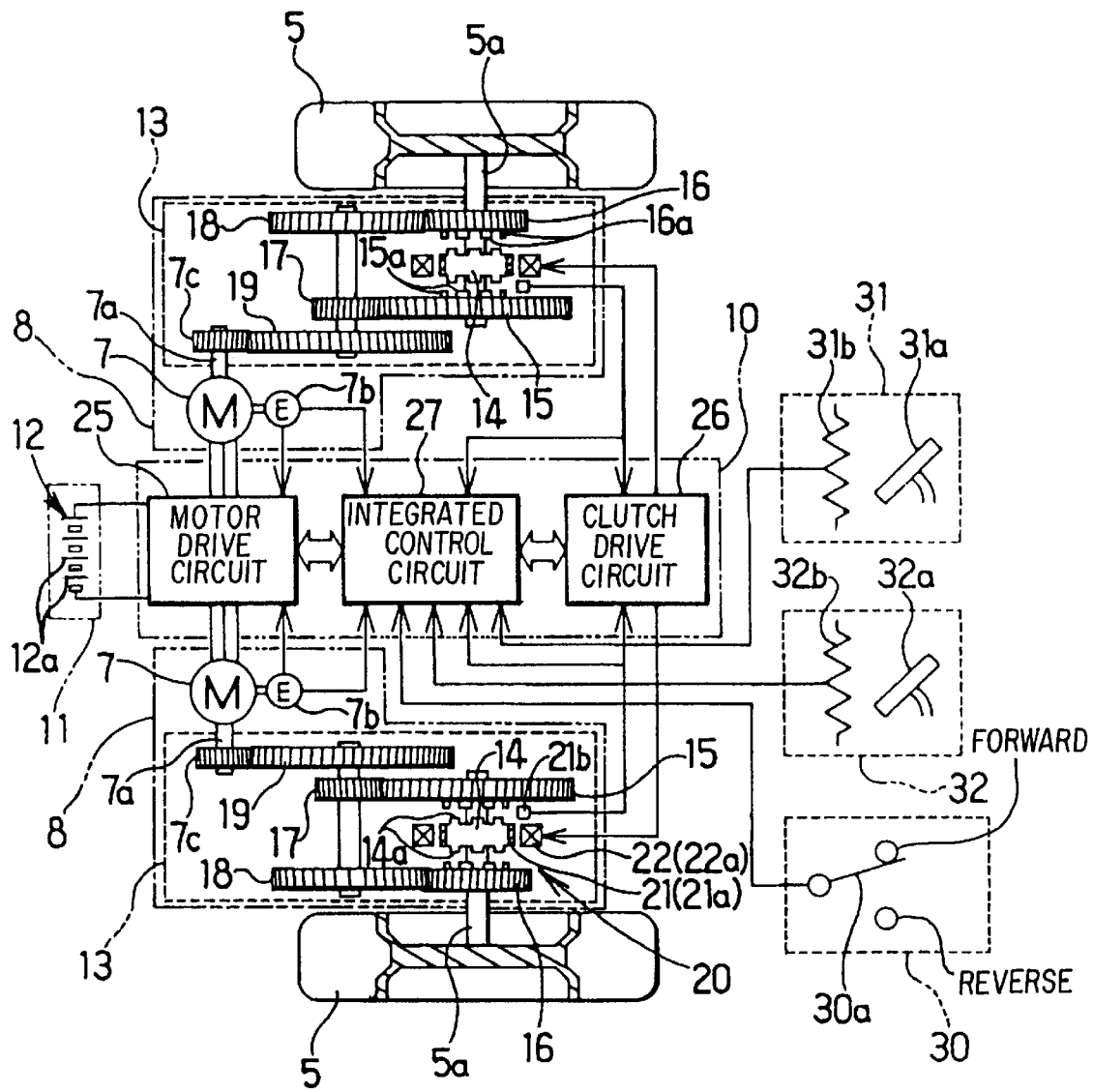
FIG. 2 is a circuit block diagram for explaining the whole configuration of the electric vehicle according to the invention.

The drive unit 8 mainly comprises a propelling motor 7 and a transmission device 13, and transmits the power of the propelling motor 7 to the rear wheels 5 through the transmission device 13 which is in the second-speed or first-speed transmission operation mode selected according to a traveling condition as shown in FIG. 2. And, the drive unit 12 is mounted on the vehicle body 2 via a damper which is not illustrated. The motor 7 and the transmission device 13 are housed into a tightly closed container which is not shown, and the case interior is filled with a lubricant.

The propelling motor 7 is a DC brushless motor which excels in durability and reliability and mounted with its motor output shaft 7a horizontal in the same way as an axle 5a to which the rear wheel 5 is connected. And, a non-contact rotational speed sensor 7b using a Hall element is provided in the neighborhood of the motor output shaft 7a. A rotational speed of the motor output shaft 7a is detected by this speed sensor 7b and outputted to the control 10. This motor speed is used for various types of controls to be described afterward.

In this embodiment, a DC brushless motor is used for the propelling motor 7, but it is not exclusive and an ordinary DC motor or an induction motor may be used.

When the DC brushless motor is used for the propelling motor, the motor speed sensor may be revolution position detecting means such as an encoder which is previously provided for the motor to control the motor revolution, and when the brushless motor without a position sensor is used, the rotational speed can be obtained from a signal for controlling commutation. Thus, structural simplification can be made in either case.

The transmission device 13 mechanically engages a dog clutch 14 spline-connected to the axle 5a which is directly connected to the propelling wheel (the rear wheel 5 in this embodiment), namely the drive wheel, with either of a first-speed revolution gear 15 and a second-speed revolution gear 16 alternatively to reduce the motor power at a high efficiency by the reduction gear ratio of the first speed or second speed and to transmit to the propelling wheel or rear wheel 5.

Specifically, a middle gear 19 is engaged with a motor output gear 7c, a first-speed reduction gear 17 and a second-speed reduction gear 18 are fixed to the same shaft as the middle gear 19, the first-speed revolution gear 15 is engaged with the gear 17, and the second-speed revolution gear 16 is engaged with the gear 18. The motor revolution output is lowered to a prescribed output by the gear ratios determined between the first-speed reduction gear 17 and the first-speed revolution gear 15 and between the second-speed reduction gear 18 and the second-speed reduction gear 16.

Therefore, when the vehicle is to be run at a low speed, the dog clutch 14 is engaged with the first-speed revolution gear 15 which is driven to reduce the speed at a relatively high reduction gear ratio, and the output of the motor 7 which is revolved as normal can be decreased highly and transmitted to the axle 5a efficiently. Thus, the motor performance can be exerted well without excessively lowering the revolution of the motor 7.

And, when the vehicle is to be run at a high speed, the dog clutch 14 is engaged with the second-speed reduction gear 16 having a low reduction gear ratio, and the high revolution output of the motor 7 is efficiently transmitted from the axle 5*a* to the propelling wheel (the rear wheel 5).

The dog clutch 14 has a projection which is formed in an inner peripheral hole fitted into a spline groove engraved in the axle 5*a* in its longitudinal direction and is disposed to be slidable in the longitudinal direction of the axle 5*a*. The dog clutch 14 is one type (jaw clutch) of engaging clutches, and has on both faces in the axial direction clutch teeth 14*a*, 14*a* in the form of a square projection intermittently formed along the circumference with the axle 5*a* at the center. On the side faces of the first-speed/second-speed revolution gears 15, 16 opposed thereto also have the similar clutch teeth 15*a*, 15*a*, 16*a*, 16*a* in the form of a square projection intermittently. These teeth 14*a*, 15*a*, 16*a* have a sectional shape in the axial direction of a square, and after a single engagement, a thrust force in the axial direction of the engagement is prevented from being produced, and the need for a pushing pressure for keeping the engagement is eliminated.

Besides, the sliding drive of the dog clutch 14 in the axial direction is performed by a three position type permanent magnet actuator 20 using electromagnetic force. The actuator 20 is connected to a clutch drive circuit 26 to be described afterward and its sliding drive operation is controlled by the clutch drive circuit 26. Accordingly, the dog clutch 14 is positioned at a neutral position where it is not engaged with the first-speed/second-speed revolution gears 15, 16 or moved to a position where it is connected to the selected first-speed or second-speed revolution gear 15, 16.

Specifically, the actuator 20 has a clutch moving unit 21 which is fixed to the outer circumference of the dog clutch 14 and mainly formed of an annular permanent magnet 21a and a clutch drive unit 22 which is fixed on the side of a drive unit 8 on its outer periphery and mainly formed of a drive coil 22*a*. And, the permanent magnet 21*a* of the clutching moving unit 21 is magnetized to have prescribed N/S poles in the axial direction.

And, by supplying an electric current to the drive coil 22*a* in a prescribed direction, an electromagnetic field having prescribed N/S poles in the axial direction is produced, an electromagnetic repulsion/attraction force is acted on the permanent magnet 21*a* of the clutch moving unit 21 by this produced magnetic field to slide in a prescribed direction, and the movement is stopped at a moved position by stopping the electrification. Therefore, the dog clutch 14 to which the clutch moving unit 21 is fixed is moved to the second-speed position, neutral position or first-speed position and can be stopped there.

And, since the dog clutch 14 is operated by the electromagnetic force, it is disposed to be operable in electrical interconnection with the propelling motor 7. Specifically, by the electromagnetic force by the clutch moving unit 21, the clutch moving unit 21 containing the dog clutch 14 is moved toward the selected first-speed or second-speed revolution gear 15, 16, to enable the interconnected operation of the timing of engaging the dog clutch 14 with the first-speed revolution gear 15 or the second-speed revolution gear 16 and the motor driving.

Furthermore, a non-contact position detecting sensor 21*b* using the Hall element or the like is disposed in the neighborhood of the clutch moving unit 21, and the output terminal of the position detecting sensor 21*b* is connected to the control 10. Therefore, by this position detecting sensor 21*b*, the current operating position of the dog clutch 14 is always detected and entered into the control 10. And, the operation position of the dog clutch 14 is used for the various types of controls to be described afterward.

The control 10 comprises a motor drive circuit 25 for controlling the output operation of the motor 7, the clutch drive circuit 26 for controlling the connection operation of the actuator 20 of the above-described transmission device 13 to the first speed or second speed, and an integrated control circuit 27 for sending an operation command to the circuits 25, 26.

For convenience of description, the integrated control circuit 27 will be described first. The integrated control circuit 27 is connected to a travel selection unit 30 which is provided in the cabin of the electric vehicle and operated by the driver, an accelerator 31, a brake 32, the speed sensor 7*b* of the propelling motor 7, and the clutch position sensor 21*b* of the transmission device 13, and receives an instruction signal based on a command by the driver and a sensor signal indicating the operation condition of equipment. And, the integrated control circuit 27 mainly comprises a microcomputer 27*a* which outputs various types of operation instructions based on the entered signals, and this microcomputer 27*a* comprises an A/D converter for converting respective input signals into digital signals, I/O ports, a CPU, a memory and the like.

And, the integrated control circuit 27 processes according to a program stored in the memory on the basis of operation of the accelerator or the brake by the driver or a detected signal from the various sensors, and outputs an appropriate operation command to the motor drive circuit 25 and the clutch drive circuit 26. Specifically, at the time of the ordinary traveling, the motor output is controlled by adjusting the output command to the motor drive circuit 25, and when the speed is changed by accelerating or decelerating the vehicle, the motor output is controlled and the operation command is sent to the clutch drive circuit 26 to control the clutch connecting operation of the transmission device 13. And, at the time of the brake causing a slip when the regeneration braking force by the regeneration brake becomes excessive with respect to the varied frictional force.

Therefore, in this embodiment, the occurrence of a wheel lock is identified by monitoring the revolving situation of the propelling wheels which are provided with the drive units. In other words, when the regeneration brake is operating, the previous rotational speed of the propelling wheel is compared with the current rotational wheel, it is judged that the propelling wheel is locked if the current rotational speed is abnormally low than the rotational speed which is presumed from the normal operating condition of the regeneration brake. And, the wheel lock is released by stopping the operation of the regeneration brake of the drive unit.

Since the drive unit 8 can be controlled independently, the wheel lock detection and the lock release are separately performed by each drive unit 8, and the slip can be prevented with reliability.

Figure 11:
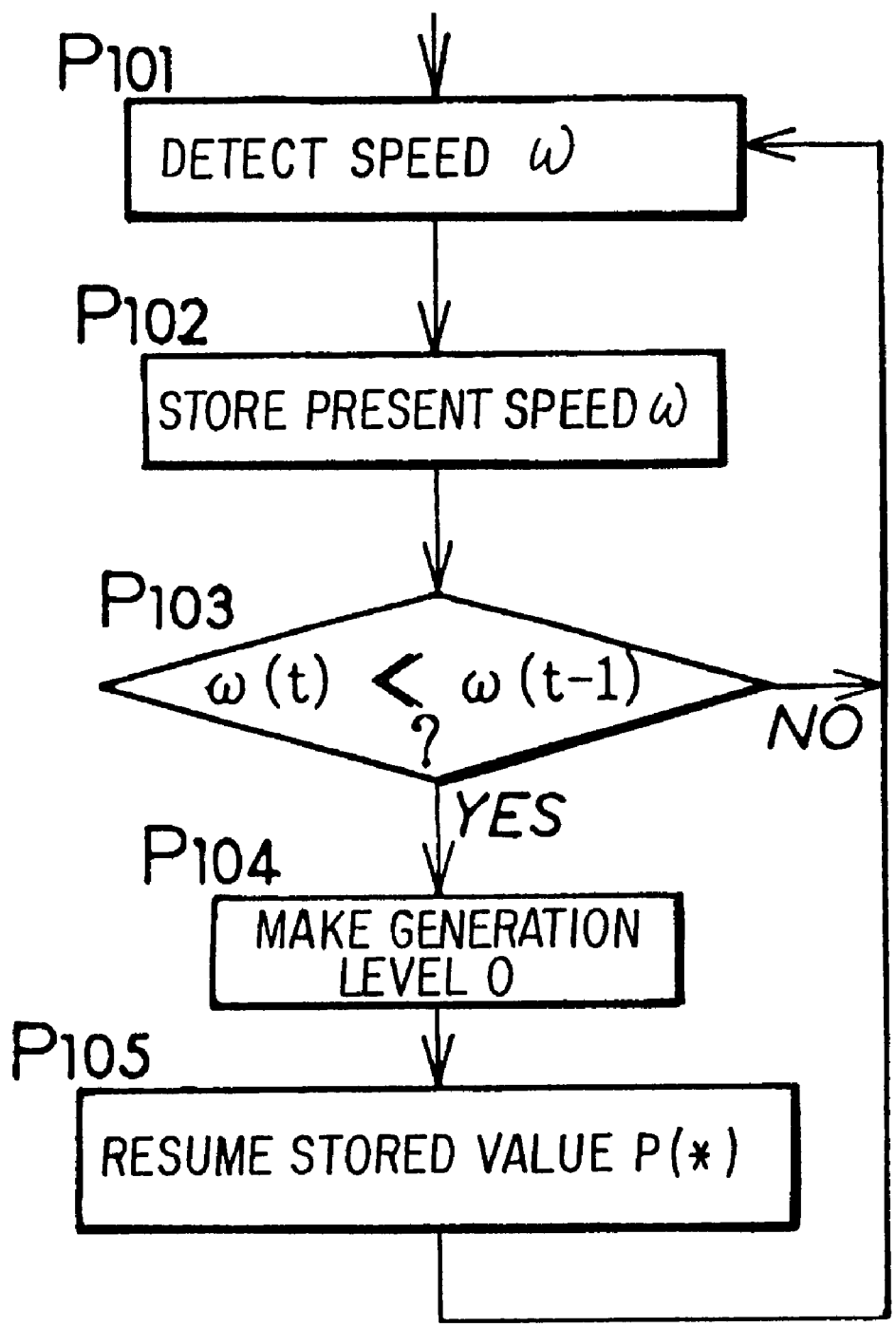
FIG. 11 is a flowchart for explaining the regeneration brake operation control of a drive unit according to the seventh embodiment of the invention.

Specifically, referring to the flowchart shown in FIG. 11 to describe this embodiment, in the first half steps P101 to P103 in the flowchart, the previous rotational speeds of the respective drive wheels are compared with the current rotational speeds to judge whether or not a wheel is locked, and in the second half steps P104 to P105, a prescribed wheel lock releasing operation is performed based on the wheel lock judgment in the first half.

In step P101, the current rotational speed $\omega(t)$ of the drive wheel is detected, and the process goes to step P102.

In step P102, the detected current rotational speed ω(t) is stored and kept in the internal memory of the integral control circuit 27, and the process goes to step P103.

And, in step P103, the previous rotational speed ω(t−1) stored in the internal memory of the integral control circuit 27 is compared with the current rotational speed ω(t), and if a difference therebetween is excessively large, it is judged that the pertinent propelling wheel is locked.

Specifically, when the brake operated normally, the rotational speed of the wheel is lowered gradually by the braking force of the brake, the traveling speed of the vehicle is gradually lowered by the frictional force working on between the wheel and the road surface, and when the vehicle finally stops, the rotational speed of the wheel becomes zero (ω(t)=0). But, when the vehicle weight changes or the road condition is deteriorated due to weather, or the tire surface is worn, the frictional force between the wheel and the road surface is lowered than normal. Therefore, the braking force by the brake becomes excessive with respect to the lowered frictional force, and the wheel may be locked because the wheels cannot revolve firmly on a road and slip, and when the braking force becomes excessive, the wheels slip on the road surface with the revolution of the wheels completely stopped. And, when the driver makes an error in the brake operation and applies an excessive braking force initially, the wheels are locked and their revolutions are stopped. In such cases, since the dynamic frictional force is smaller than the static frictional force, the frictional force between the wheels and the road surface is decreased, and the stopping distance of the vehicle by the brake with the wheels locked becomes very long. And, even if the vehicle has not stopped, the current traveling speed ω(t) is sharply lowered with respect to the just previous traveling speed ω(t−1), and the traveling speed to be detected becomes mostly a stopped state (ω(t)=0). Therefore, in such a case, an error is included in the detection of the vehicle's speed, and when the brake is released to resume the traveling, the travel control becomes not good.

Therefore, when the current traveling speed ω(t) is very small as compared with the just previous traveling speed ω(t−1), namely the traveling speed is lowered abnormally, it is judged that the wheels are locked, and the process goes to the wheel lock releasing process of step P104 and following. On the other hand, when the current traveling speed ω(t) is between the just previous traveling speed ω(t−1) and the speed reducing range by the normal braking operation, it is judged that the wheel lock has not occurred, and the process returns to step P101 to continue the braking operation. Speed information which is obtained from the drive unit 8 which was judged to have caused the wheel lock is not used for the travel control until the wheel lock is released though the speed detection is continued.

And, in step P104 that the occurrence of the wheel lock was identified, the regeneration instruction signal value from the integral control circuit 27 is changed, the regeneration braking level by the motor 7 is lowered to zero, and the regeneration braking operation is released temporarily. In other words, the braking force by the motor 7 is minimized, and the propelling wheel which has its revolution locked by the regeneration brake falls in a free-run state. Therefore, the wheel revolves again, and its normal frictional force against the road surface is restored. Thus, the process goes to step P105.

In step P105, a motor output instruction value (P*) is outputted from the integrated control circuit 27, the revolution of the motor 7 is resumed based on the instruction value (P*), and the process returns to step P101.

A time duration for detecting the rotational speed of the wheel to be compared and a difference for judging as the wheel lock, namely a change in unit time of the traveling speed, are set to values so that the wheel lock can be detected securely and accurately. In other words, arbitrary optimum values are selected from the vehicle's balance of center of gravity, an inertia force owing to the vehicle weight, the traveling speed and the like. And, configuration may be made to automatically reset such values according to the traveling situations or as the driver desires.

As described above, according to this embodiment, even when the wheel lock occurs due to a panic braking operation when traveling, a braking operation on a slippery road surface, or an excessive braking force applied to the wheel with a certain drive unit, it is judged from a sharp change in the rotational speed of the pertinent wheel that the wheel has locked, the regeneration braking operation of the drive unit is temporarily stopped, and the regeneration braking level of the regeneration brake is minimized to release the wheel lock.

By the drive units provided for each wheel, the change in braking force can be made easily electrically as compared with the mechanical brake, the propelling wheels can be rotated immediately without torque to release the wheel lock without fail, and sufficient safety can be secured.

Besides, when the drive wheels are locked during braking, the right and left balance of the vehicle body is unbalanced and the vehicle skids easily, but the wheel lock releasing function is separately provided for respective sides, the braking of the drive wheel which is slipping can be controlled to operate properly, and the appropriate braking operation does not affect on the straight movement of the vehicle, so that the vehicle can be prevented from skidding. Thus, yawing can be controlled.

Furthermore, by using means which are previously provided for detecting the rotational speed of the propelling wheel, the wheel lock is identified in view of the revolving situation of the propelling wheels to which the regeneration braking operation is being made to achieve the present invention with the need for a special dedicated wheel lock detecting equipment eliminated, so that the invention can be readily applied to the conventional electric vehicle, and the cost reduction can be made.

The eighth embodiment of the invention will be described with reference to the flowchart shown in FIG. 12.

In addition to the same configuration as in the first embodiment, the drive unit 8 in this embodiment compares a motor output torque instruction value outputted from the control with the actual motor output torque value calculated from the electric current consumed by the motor to identify a tire slip. In other words, when the torque instruction value contained in the motor output instruction value P(*) is different from a motor output torque presumed from the consumed power actually detected, it can be judged that a tire slip has occurred. And, the traveling speed which is obtained from the drive unit which is judged causing the tire slip is not used as data for controlling the running.

The propelling motor in the drive unit 8 in this embodiment is a DC brushless motor. It is known that in this DC motor, the electric current consumed by the motor is proportional to the torque outputted by the motor, and the voltage consumed by the motor is proportional to the motor speed. Therefore, by detecting that the relations of such values do not conform mutually, it can be judged that the operation is not normal because of the occurrence of a slip or the like. In other words, if the actual torque output does not reach the target torque output value for example, it can be judged that the wheels are revolving excessively on the road surfaces and slipping.

Figure 12:
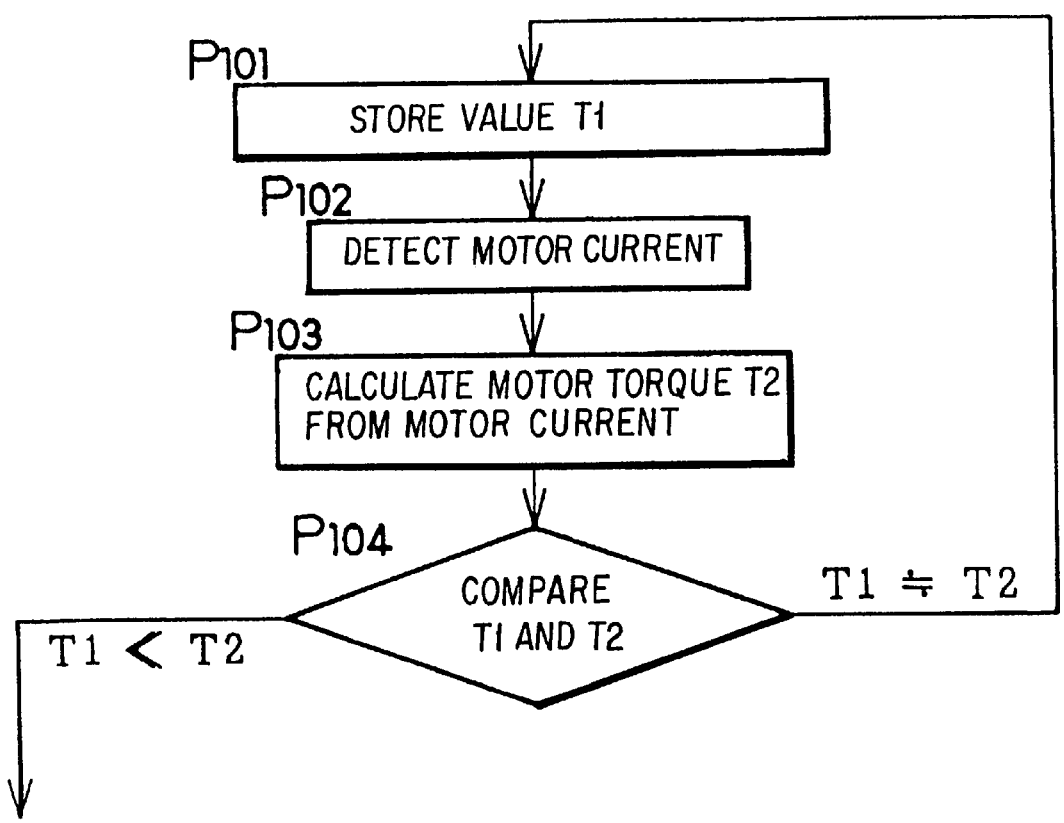
FIG. 12 is a flowchart for explaining the wheel slip judgment by a drive unit according to the eighth embodiment of the invention.
Figure 13:
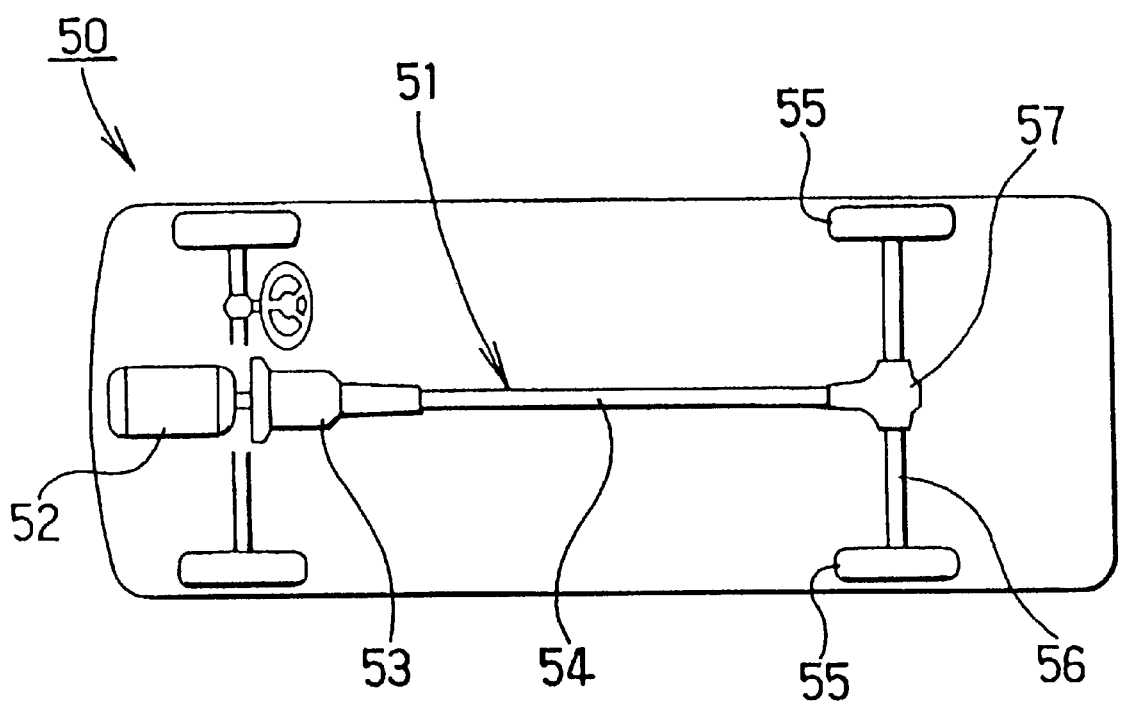
FIG. 13 is a plan view for showing the whole configuration of an electric-power four-wheel car according to a conventional electric vehicle.

Specifically, as shown in the flowchart of FIG. 12, in the control according to this embodiment, a motor output torque instruction value T1 contained in the motor output instruction value P(*) is stored and kept in the internal memory of the integrated control circuit 27 in step P101, and the process goes to step P102.

Then, in step P102, the motor consumption electric current at the moment is detected by motor consumption electric current detecting means, and read into the integrated control circuit 27.

In step P103, the integrated control circuit 27 calculates and presumes a torque value T2 being outputted from the motor based on the detected motor consumption electric current with the reduction ratio according to the gear position of the transmission device 13 at the moment taken into consideration. And, the torque value T2 is stored and kept in the internal memory of the integrated control circuit 27, and the process goes to step P104.

Then, in step P104, the motor output torque instruction value T1 is compared with the torque value T2 being outputted from the motor 7 to judge whether or not a slip has occurred.

Specifically, when the actually outputted motor torque value T2 is smaller than the motor output torque instruction value T1 by the specified value or more, it is judged that the propelling wheel 5 provided with the drive unit 8 is revolving excessively and slipping. In other words, since the propelling wheel 5 is slipping, the motor 7 cannot produce the target torque.

When the outputted motor torque value T2 is within the specified value range of the motor output torque instruction values T1, it is judged that the propelling wheel 5 is properly revolving.

The detecting method of this embodiment can be applied when the propelling wheel is locked and stopped revolving at the time of operating the regeneration brake. In other words, the target regeneration torque which is presumed from the regeneration brake instruction value is compared with the actually produced regeneration torque, and when the actual regeneration torque does not reach the target torque, it can be judged that the wheel is locked.

And, this embodiment is configured to provide dedicated motor consumption electric current detecting means on the power supply route to the motor, but when a residual capacity meter which is previously mounted on the battery unit uses a method of adding up the discharged electric currents or can monitor the discharged electric current to the motor system for propelling, the motor consumption electric current value may be discriminately obtained from the residual capacity meter and the need for the dedicated motor consumption electric current detecting means can be eliminated. Therefore, when the motor supply power detecting means comprise the residual capacity meter as described above, the invention can be achieved without the addition of an additional circuit/equipment, so that the cost can be lowered and cost effectiveness can be improved.

Besides, the torque instruction value contained in the motor output instruction value P(*) is compared with the actual motor output torque converted from the motor consumption electric current, but the invention is not limited to it, and the motor consumption electric current may be calculated from the torque instruction value, and such motor consumption electric currents can be compared to judge a slip. operation, the motor drive circuit 25 is controlled to the regeneration mode to perform the regeneration brake operation temporarily using the motor 7 as a generator.

And, the travel selection unit 30 has an alternative selection lever and a forward or reverse travel instruction signal is outputted by the driver operating the lever. And, the travel command signal is entered into the integrated control circuit 27. And, the accelerator 31 has a variable resistor 31b connected to an accelerator pedal 31a to obtain an output voltage signal according to an accelerator operating level by the driver. And, the signal is similarly entered into the integrated control circuit 27. Besides, the brake 32 similarly has a variable resistor 32b connected to a brake pedal 32a to enter an output voltage signal according to a brake operating level by the driver into the integrated control circuit 27.

Figure 3:
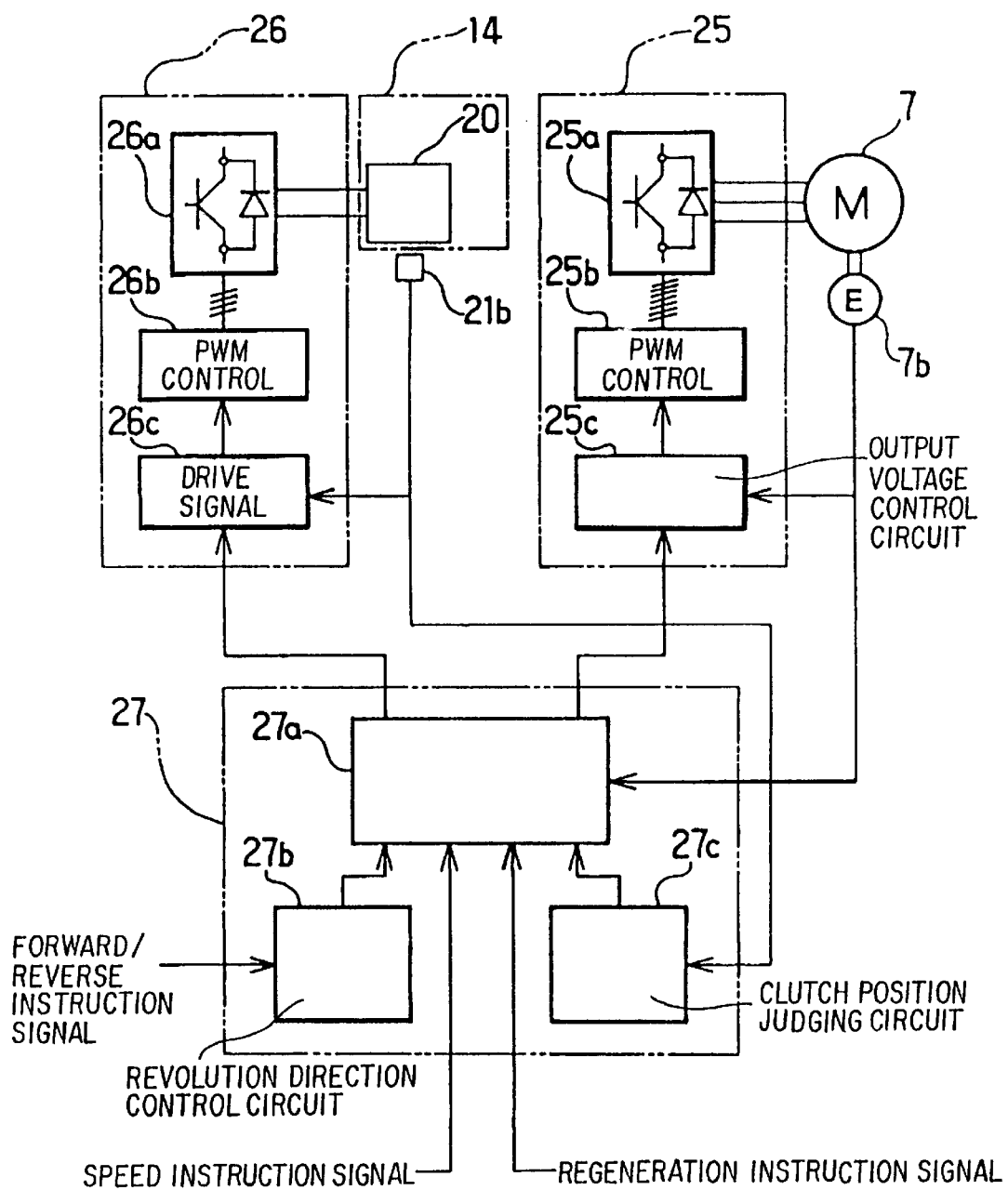
FIG. 3 is a circuit block diagram for explaining an integrated control circuit, a motor drive circuit and a clutch drive circuit of the electric vehicle according to the invention.

Specifically, the integrated control circuit 27 has a revolving direction control circuit 27b which has the input terminal connected to the travel selection unit 30, and a clutch position judging circuit 27c which has the input terminal connected to the clutch position sensor 21b provided for the actuator 20 of the dog clutch 14 as shown in FIG. 3. The output terminals of these circuits 27b, 27c are connected to the microcomputer 27a. And, the revolving direction control circuit 27b, based on a forward/reverse travel command outputted from the travel selection unit 30 by the driver who operates the lever, determines the direction of motor revolution for the forward/reverse travel, and outputs the determined motor revolution direction signal to the microcomputer 27a. And, the clutch position judging circuit 27c, based on the sensor signal from the clutch position sensor 21b for the dog clutch 14, judges the operation position of the clutch at that time, and outputs the judged clutch operation position signal to the microcomputer 27a.

In order to simplify the description, FIG. 3 shows only the integrated control circuit 27 and one set of the motor drive unit and the clutch drive unit controlled by the integrated control circuit 27. The integrated control circuit 27 controls the drive units 8, 8 which are independently provided for the rear right and left wheels 5, 5, namely two sets of the motor drive units and the clutch drive units, separately.

Thus, the microcomputer 27a of the integrated control circuit 27 receives the motor revolution direction signal from the revolution direction control circuit 27b according to the forward/reverse lever operation by the driver, and when the driver performs the accelerator operation from the travel selection unit 30, receives a speed instruction signal according to an accelerator operating level by the driver outputted from the accelerator 31, and when the driver operates the brake, receives a regeneration instruction signal according to a brake operating level by the driver outputted from the brake 32. Besides, based on a motor speed signal from the revolution speed sensor 7b disposed on the motor 7 and a sensor signal from the clutch position sensor 21b, the clutch position signal judged by the clutch position judging circuit 27c is kept inputted. And, based on the inputted signals, calculation is conducted according to the processing procedure previously provided in the microcomputer 27a, a motor output instruction value signal (P*) is outputted to the prescribed motor drive circuit 25, and a clutch operation instruction signal is outputted to the prescribed clutch drive circuit 26.

The motor drive circuit 25 has an output voltage control circuit 25c for producing and outputting an output voltage signal based on the motor output instruction value signal (P*) from the microcomputer 27a, a PWM control circuit 25b for producing and outputting a chopper pulse signal based on the output voltage signal, and a three-phase full bridge inverter circuit 25a which has a bipolar transistor (hereinafter called "BJT") device which can perform a quick switch on/off operation of the motor 7 to the battery power supply 12 and makes a switching operation according to a chopper pulse signal. And, according to the motor output instruction value signal (P*), the three-phase full bridge inverter circuit 25a is chopper-controlled by a prescribed switching operation to increase or decrease an effective voltage to be supplied to the propelling motor 7, thereby controlling the motor outputs such as a rotational speed and torque of the motor 7.

The clutch drive circuit 26 comprises a drive signal forming circuit 26c for producing and outputting a chopper ratio signal based on the clutch operation instruction signal from the microcomputer 27a, a PWM control circuit 26b for producing and outputting a chopper pulse signal based on the chopper ratio signal, and an H bridge inverter circuit 26a mainly using a BJT device which can perform a quick switching operation and for flowing an electric current in a prescribed direction through the drive coil 22a provided for the clutch drive unit 22 of the actuator 20 by the switching operation of the BJT device based on the chopper pulse signal. And, according to the clutch operation instruction signal, the H bridge inverter circuit 26a performs the switching operation to flow an electric current under control through the drive coil 22a of the actuator 20 in a prescribed direction for a prescribed duration. And, by the electromagnetic force produced, the dog clutch 14 is alternatively positioned at the prescribed first-speed position, neutral position or second-speed position, thereby controlling the engagement and disengagement of the clutch.

Both inverter circuits 25a, 26a have used the BJT device as the switching device, but it is not exclusive, and an MOS-FET device (electric field effective transistor) or an IGBT device may be used as required.

By structuring the electric vehicle as described above, when the driver turns on a main key switch, the power supply circuit operates, electric power is supplied from the battery power supply 12 to respective on-board equipment, and the vehicle can be started to move. Then, when the driver operates the accelerator, the integrated control circuit 27 instructs the motor drive circuit 25 to make an appropriate motor output operation accordingly. Based on the operation instruction, the motor drive circuit 25 increases or decreases the electric power supplied to the propelling motor 7 in the drive unit 8 to adjust the output of the propelling motor 7. And, the motor output thus produced is converted into appropriate torque according to the first-speed or second-speed operation mode of the transmission device 13 and transmitted to the rear wheels 5 to run the electric vehicle 1 at a speed desired by the driver. And, when the driver performs the braking operation, a non-illustrated mechanical braking apparatus operates to stop the output operation of the motor. At the same time, the regeneration brake which temporarily uses the propelling motor 7 as a generator operates to decelerate the electric vehicle 1. In other words, by the motor generation in the regeneration brake mode, the motion energy which must be decreased when decelerating the vehicle is converted into electric energy, and the generated energy is recovered into the storage batteries.

Figure 4:
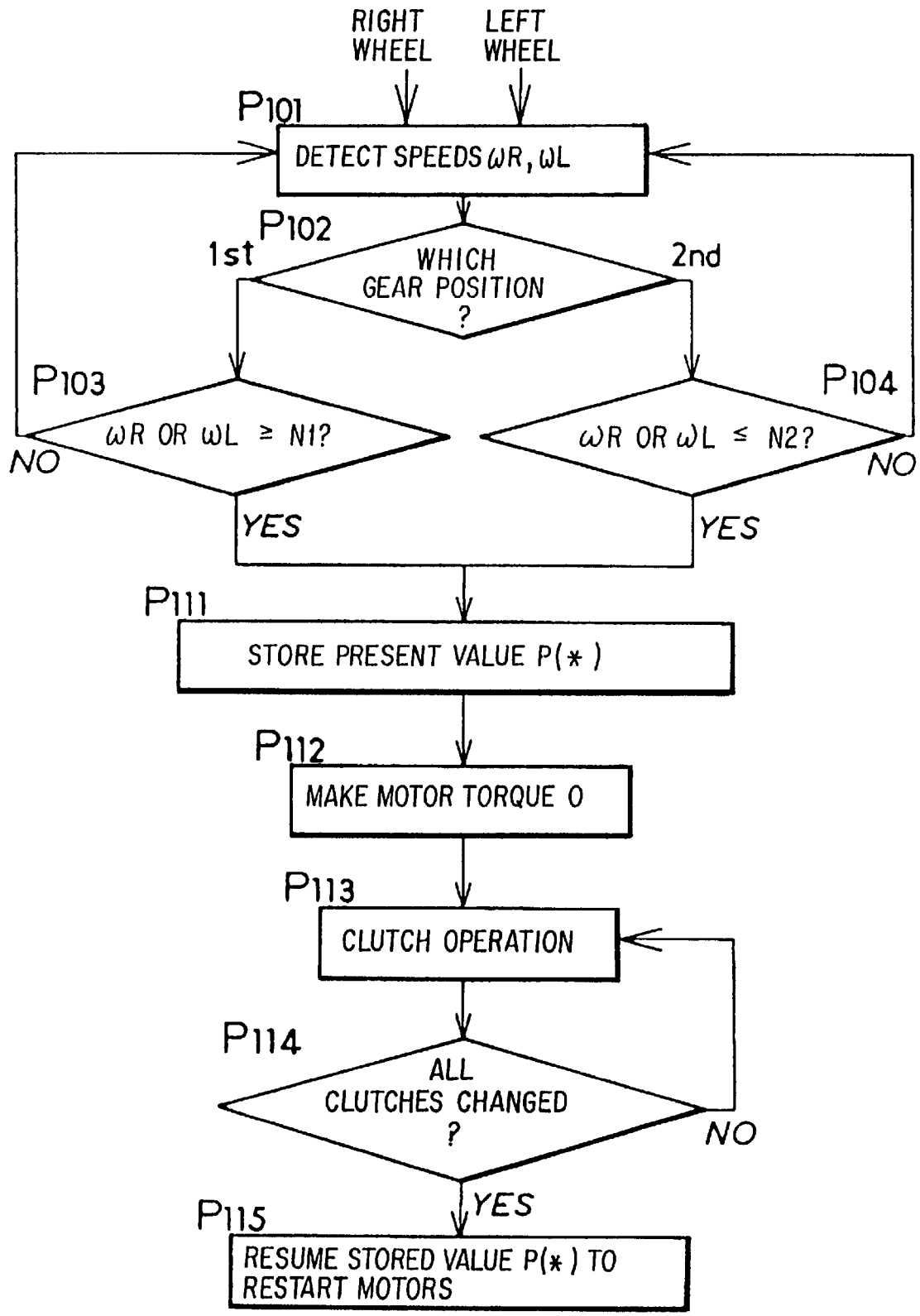
FIG. 4 is a flowchart for explaining the gear change operation control of a drive unit according to the first embodiment of the invention.

Then, the operation control in the first embodiment of the present invention achieved by using such a plurality of drive units 8 will be described with reference to the flowchart shown in FIG. 4.

In a judging method that the vehicle's traveling speed is presumed from the motor speeds detected from the respective drive units 8, and the traveling speed is compared with a gear-change speed to judge whether or not the gear change shall be made, this embodiment, when any one of the plurality of traveling speeds obtained from the respective drive units reaches the gear change speed, operates all drive units 8 simultaneously for the gear change.

And, the changing speed as a criterion for performing the gear change is not a single value but determined to be different values for shifting the gear up and down. Since the hysteresis characteristic is provided in judging the performance of gear change, when the vehicle speed is in the neighborhood of the boundary speed range, frequent gear change operations are prevented from occurring, and comfortable traveling can be made.

In this embodiment, the vehicle's traveling speed is presumed from the operating condition of the motor 7 which is connected to the propelling wheel 5 through the transmission mechanism of the transmission device 13 provided that the propelling wheel 5 does not slip on a road. Specifically, in view of the rotational speed of the motor 7 at that instant and a reduction ratio based on the selected first-speed or second-speed gear position, the revolution speed of the propelling wheel 5, namely the traveling speed, can be presumed easily. This is also applied to the respective embodiments to be described afterward.

And, since the traveling speed is independently obtained from the respective drive units 8 which drive the right and left propelling wheels 5, a speed difference between the right and left wheels based on an inner radius difference while the vehicle is turning is compensated to provide the same condition appropriately by detecting a steering angle of the steering wheel 6 and calculating a turning radius from the detected steering angle. This is also applied to the respective embodiments to be described afterward.

In the first half steps P101 to P104 in the flowchart, it is judged whether or not the gear change shall be performed, and in the second half steps P111 to P115, the gear change is performed based on the judgment in the first half. The same procedure is applied to the gear change operation from steps P111 to P115 in the respective embodiments to be described afterward.

In step P101 of the flowchart, rotational speeds $\omega R$, $\omega L$ of the rear right and left wheels 5, 5 at the moment are detected and read into the integrated control circuit 27. Specifically, the rotational speeds of the respective motors 7 at the moment are detected from the speed sensors 7b provided for the propelling motors 7 of the respective drive units 8 which drive the rear wheels 5, 5 respectively. Then, the process goes to step P102, where the connection position of the dog clutch 21 at the moment, namely the gear position, is identified, and the process is branched according to the identified gear position. In other words, when the gear position is in the first-speed position, the process goes to step P103, and when it is in the second-speed position, the process goes to step P104.

And, in step P103 where the gear position is identified to be in the first-speed position, it is judged whether or not either of the detected traveling speeds $\omega R$, $\omega L$ of the vehicle has increased to a changing speed N1, and if increased, the process goes to step P111 and following, the gear change operation is performed to shift up all the transmission devices 13 of the respective drive units 8, and when neither of the traveling speeds $\omega R$, $\omega L$ increases to the changing speed N1, the process returns to step P101.

And, in step P104 where it is identified that the gear position is in the second-speed position, it is judged whether or not either of the detected traveling speeds R, L has lowered to a changing speed N2, and if lowered, the process goes to step P111 and following, the gear change operation is performed to shift down all the transmission devices 13 of the respective drive units 8, and when neither of the traveling speeds ωR, ωL lowers to the changing speed N2, the process returns to step P101.

Figure 5:
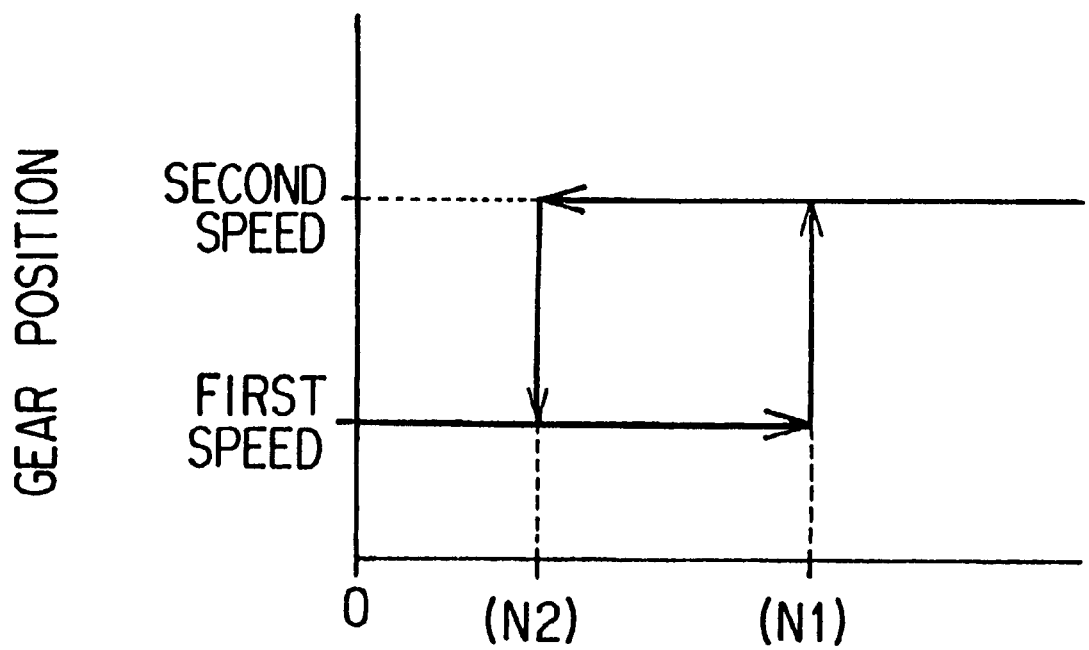
FIG. 5 is a graph for explaining that a hysteresis property is set for the gear change judgment according to the first embodiment of the invention.

In this embodiment, as shown in FIG. 5, a changing speed N where an automatic gear change is judged is not a single value but set to different values according to a situation by distinguishing between shifting up and shifting down the gear. In other words, the respective changing speeds N for shifting up and shifting down the gear position are not the same value, but a changing speed N1 for judging the shift up and a changing speed N2 for judging the shift down which is a smaller value with a difference of a prescribed value secured from the changing speed N2 are set. Therefore, when a certain gear change operation is completed, a prescribed difference is produced between the traveling speed of the vehicle at the competed moment and the changing speed N1 or N2 which is a criterion for the next gear change. And, when the traveling speed of the vehicle which has the gear position in the first-speed position is increased to reach the changing speed N1 for example, the gear change operation is performed immediately, and the gear position is changed to the second-speed position, and even when the traveling speed is slightly lowered at the completion of changing operation, the gear change operation is prevented from being shifted down. As a result, the hysteresis characteristic can be given to the gear change operation, so that frequent gear change operation can be prevented, and comfortable running can be secured.

When it is judged to perform the gear change in the above-described steps P101 to P104, the gear change is performed in the following steps P111 to P115.

Specifically, a motor output instruction value (P*) corresponding to the traveling situation which is being output from the integrated control circuit 27 is stored in the memory to be temporarily kept in step P111.

Then, the output of the motor 7 is controlled by the integrated control circuit 27, and the motor output torque is minimized in step P112. Specifically, the motor supply current is lowered to a prescribed value, and the motor 7 is put in a revolution keeping state for merely keeping the immediately previous rotational speed, or a free-run state that no electric current is supplied to the motor. Therefore, since the output torque of the motor 7 is minimized, the engagement of the former dog clutch 14 and the first-speed or second-speed revolution gear 15, 16 can be released smoothly in the next step P113.

And, in step P113, a changing instruction is outputted from the integrated control circuit 27 to the clutch drive circuit 26, an electric current is flown through the actuator 20 under control by the clutch drive circuit 26, the engagement between the first-speed or second-speed revolution gear 15, 16 and the dog clutch 14 is released by the actuator 20, and the released dog clutch 14 is connected to the other revolution gear.

In step P114, by the sensor signals from the clutch position sensors 21b of the respective drive units 8, it is judged whether or not the clutch changing connection of all the drive units 8 has completed, and if it has completed, the process goes to step P115, but if not, the process returns to step P113.

And, in step P115, the stored motor output instruction value (P*) is resumed, and based on this value (P*), the drive of the propelling motors 7 of all the drive units 8, 8 is restarted to return to the normal traveling mode, and the outputs of the motors 7 are controlled according to the accelerator operation by the driver to accelerate or decelerate the vehicle.

Therefore, since the torque outputs of the propelling motors 7 of the respective drive units 8 are started after checking the completion of the gear change in all the drive units 8, 8, a shock at the time of changing can be prevented from occurring. And, since it is designed to start the torque production of the respective drive units 8 at the same time, a traction balance of the vehicle can be prevented from being unbalanced, and the vehicle can run with the traveling balance kept in a good condition.

And, the clutch changing operation in steps P112 to P114 is performed as follows.

When the dog clutch 14 is connected to the first-speed or second-speed revolution gear 15, 16, this clutch operation comprises an engagement releasing operation and a connecting operation for connecting the dog clutch 14 to the selected first-speed or second-speed revolution gear 15, 16.

Description will be made of the clutch releasing operation. This clutch releasing operation puts the motor 7 in a revolution keeping state for keeping the immediately previous rotational speed, or a free-run state with the motor supply electric current eliminated to make the output torque from the motor 7 to zero or minimum to facilitate the releasing of the engagement. Therefore, since the motor output torque is minimized, the torque transmitted from the engaged driving-side first-speed or second-speed revolution gear 15, 16 to the driven-side dog clutch 14 is minimized. At the same time, electrification to the actuator 20 is controlled so that the moving position of the dog clutch 14 becomes the neutral position. Thus, since the output torque from the motor 7 is minimized, the transmission torque is minimized, the driven-side dog clutch 14 can be easily separated from the engaged driving-side first-speed or second-speed revolution gear 15, 16, namely the fitting between the driving-side and driven-side clutch teeth is released easily, and the dog clutch 14 can be moved to the neutral position.

Then, description will be made of the clutch connecting operation. In this clutch connecting operation, to connect the dog clutch 14 to the first-speed revolution gear 15 or second-speed revolution gear 16 which is driven by the motor 7, the rotational speed of the first-speed or second-speed revolution gear 15, 16 is determined to be connected while keeping a prescribed speed difference with respect to the rotational speed of the dog clutch 14.

Specifically, the dog clutch 14 used for the transmission device 13 in this embodiment is one type of claw clutches and has a very low connection stochastic property of 1 to 2% in a single trial (engagement performed one time). Accordingly, when the dog clutch 14 is to be engaged, the rotational speed of the driving-side first-speed or second-speed revolution gear 15, 16 on the driving side is set to be slightly higher than the rotational speed of the dog clutch 14 on the driven side which is slid to be engaged, so that the connection can be made securely and smoothly. And, since this speed difference is determined to make the driving side faster, the reverse revolution of the motor 7 can be prevented at the time of connecting the dog clutch to start the vehicle from the stationary state, and a shock which is felt when braking is prevented from occurring when shifting down or shifting up for accelerating.

The speed of the motor 7 is increased or decreased to the target speed as described above, and the target speed is determined to be slightly higher than the rotational speed of the driven-side dog clutch 14. In other words, the target speed is determined to be a speed slightly higher than the speed of the dog clutch 14 which is considered moving at a stable constant speed when the gear change is performed instantaneously. And, this speed difference is set to be larger than the rotational speed difference to deviate the dog clutch 14 and the first-speed revolution gear 15 or second-speed revolution gear 16 to be connected thereto by a single tooth in the circumferential direction. This speed difference is so determined that, for example, when the rotational speed of the dog clutch 14 is 1000 RPM, the rotational speed of the first-speed or second-speed revolution gear is 1010 to 1020 RPM, and quite small.

And, it is detected and confirmed by the speed sensor 7b on the motor side that the first-speed or second-speed revolution gear 15, 16 accelerated or decelerated by the motor 7 has reached the target speed slightly higher than the rotational speed of the driven-side dog clutch 14, the motor 7 is controlled to keep its rotational speed, and the electrification to the actuator 20 is controlled to start the connecting operation of the gear change. And, the leading ends of the clutch teeth 14a of the dog clutch 14 in the shifting direction come to contact with the ends of clutch teeth 15a or 16a of the first-speed or second-speed revolution gear 15, 16, and at this moment, the dog clutch 14 and the first-speed or second-speed revolution gear 15, 16 are not mutually engaged substantially in view of the probability, the dog clutch 14 stops moving, but their engagement is completed in a short time. Specifically, they are mutually deviated by a single clutch tooth because of the speed difference between them, and the dog clutch teeth 14a and the clutch teeth 15a or 16a of the first-speed or second-speed revolution gear 15, 16 are engaged properly. Therefore, since the driving-side speed is slightly higher than the driven-side speed, even when the teeth of the dog clutches are mutually contacted which happens often in view of the probability, they can be deviated to the position to be properly engaged mutually and connected by a relative difference in rotation between them. And, at this time, the speed difference between them is slightly larger to deviate the dog clutches by one tooth, so that a shock at the time of connecting the dog clutches can be lowered. Besides, since the speed on the drive side is slightly faster than the speed on the driven side, the connection shock can be directed toward the moving direction, and a discomfort feeling at the time of speed change can be relieved.

Therefore, since a slight difference in rotational speed is provided between the dog clutch to be engaged and the output gear, the reliability of engagement can be improved.

And, since the rotational speed of the connecting drive-side dog clutch is determined to be slightly higher than the rotational speed of the driven-side dog clutch, this rotational speed difference can direct the direction in which a shock is produced at the time of connecting the clutches toward the traveling direction, and a discomfort feeling at the time of speed change can be relieved.

This method of securing the hysteresis property for the gear change operation by differing the changing speed for judging the shift up from the changing speed for judging the shift down is also used in the respective embodiments to be described afterward.

And, in this embodiment, the reduction gear mechanism was provided on the motor side, the plurality of gears revolving at a prescribed reduction ratio were provided and the dog clutch to be selectively connected to these gears was provided on the axle side, but they can be provided reversibly. This is also applied to the respective embodiments to be described afterward.

Besides, this embodiment was described with reference to the two-stage transmission device, but not limited to it, and can be applied to other stage type transmission devices. And, in such a multi-stage transmission device, a changing speed for an appropriate gear position may be determined according to a speed range where each gear change is performed.

Furthermore, in the flowchart of this embodiment, the branching process is performed depending on the gear position, but it may be performed depending on the increase or decrease of the vehicle's traveling speed, namely depending on accelerating or decelerating.

As described above, according to this embodiment, the plurality of drive units including the transmission for revolving each propelling wheel are mounted on the vehicle and controlled independently, so that flexible control can be made separately and the total running performance can be improved.

Specifically, as compared with the mechanical differential method, the torque distribution for the vehicle as the whole can be changed freely and set to an optimum value according to the vehicle's balance of center of gravity, and designing flexibility can be improved extensively.

And, even when traveling speeds obtained from the plurality of drive units are different owing to changes of road surface conditions due to a bad road, weather or the like, or unbalanced air pressures in the tires, all drive units can be operated for gear changing based on a certain speed signal to provide the stable operation, so that a sufficient safety can be secured.

Besides, the gear change of all drive units can be started at the same time, and the output operation of all drive units can be restarted after the completion of the gear change of all drive units, so that the traveling balance is prevented from being varied before and after the gear changing.

Since the hysteresis property is provided for the gear-change operation, frequent gear change operations are prevented, comfortable and stable traveling of the vehicle can be made, and the traveling performance can be improved.

Furthermore, since the direct driving by connecting the motor to the drive wheel through the transmission is provided, the need for the propeller shaft for transmitting the drive force is eliminated, the transmission mechanism is simplified, and the transmission for reducing the drive force is provided, so that the high efficient range of the motor can be used always and the motor size is made compact. Therefore, the space occupied by the drive force transmitting system in the vehicle can be made very small, and the flexibility of designing the vehicle appearance and vehicle body can be improved.

In addition, the transmission device can be configured by the dog clutch which is simple in structure, inexpensive and good in durability. Besides, as compared with the hydraulic transmission and the continuously variable transmission, high efficiency in transmission performance can be achieved. Specifically, the dog clutch which is one type of the electromagnetically operated claw clutches and the drive side or driven side are mechanically engaged to transmit the drive force, so that a high transmission efficiency can be achieved. For example, this claw clutch can improve the transmission efficiency to about 90% or more as compared with the transmission efficiency of 70% by the conventional frictional transmission by a V-belt. This is because in the case of the belt transmission, a large transmission loss is caused due to slip, friction, deformation of the belt during transmission, while such a loss is quite small in the transmission by engagement.

And, since the engagement and disengagement of the clutch in the transmission is electrically performed by the electromagnetic force, the clutch operation performance can be improved by keeping the electrical connection with the motor. Specifically, when the clutch is engaged or disengaged, since the motor torque and speed can be instantaneously changed to an appropriate level and controlled according to the clutch operation signal, the engagement, connection or disengagement of the shifting clutches can be made smoothly, the secure and comfortable clutch operating feeling can be obtained, and the clutch engagement and disengagement performance can be improved.

Now, the second embodiment of the invention will be described with reference to the flowchart shown in FIG. 6.

In this embodiment, to perform the automatic gear change judgment according to the vehicle's traveling speed, the traveling speeds are detected from the respective drive units, and when the detected values are mutually different, an appropriate detected value is selected according to the shift-up or shift-down situation, thereby improving the accuracy of the speed change operation.

As described above, since the vehicle's traveling speed is presumed based on the revolution of the motor which is connected to the propelling wheel through the respective reduction gears, when a propelling wheel does not properly contact to a ground and slips, it is disadvantageous that the actual traveling speed cannot be obtained. For example, when a propelling wheel revolves excessively and slips on a road surface during acceleration, the rotational speed of the slipped propelling wheel becomes higher than the actual traveling speed. On the other hand, when a propelling wheel cannot revolve firmly on a road and slips during deceleration by braking, the rotational speed of the slipped propelling wheel becomes lower than the actual propelling speed.

Therefore, in this embodiment, if different detected speed values are obtained from the respective drive units, the shift-up judgment is made according to the speed of a slower propelling wheel when traveling at the first speed where the shift up is caused, and the shift-down judgment is made according to the speed of a faster propelling wheel when traveling at the second speed where the shift down is caused, a more accurate propelling speed is selected to improve the accuracy of controlling the speed change as the vehicle, and the hysteresis property for the gear change operation is enhanced.

Figure 6:
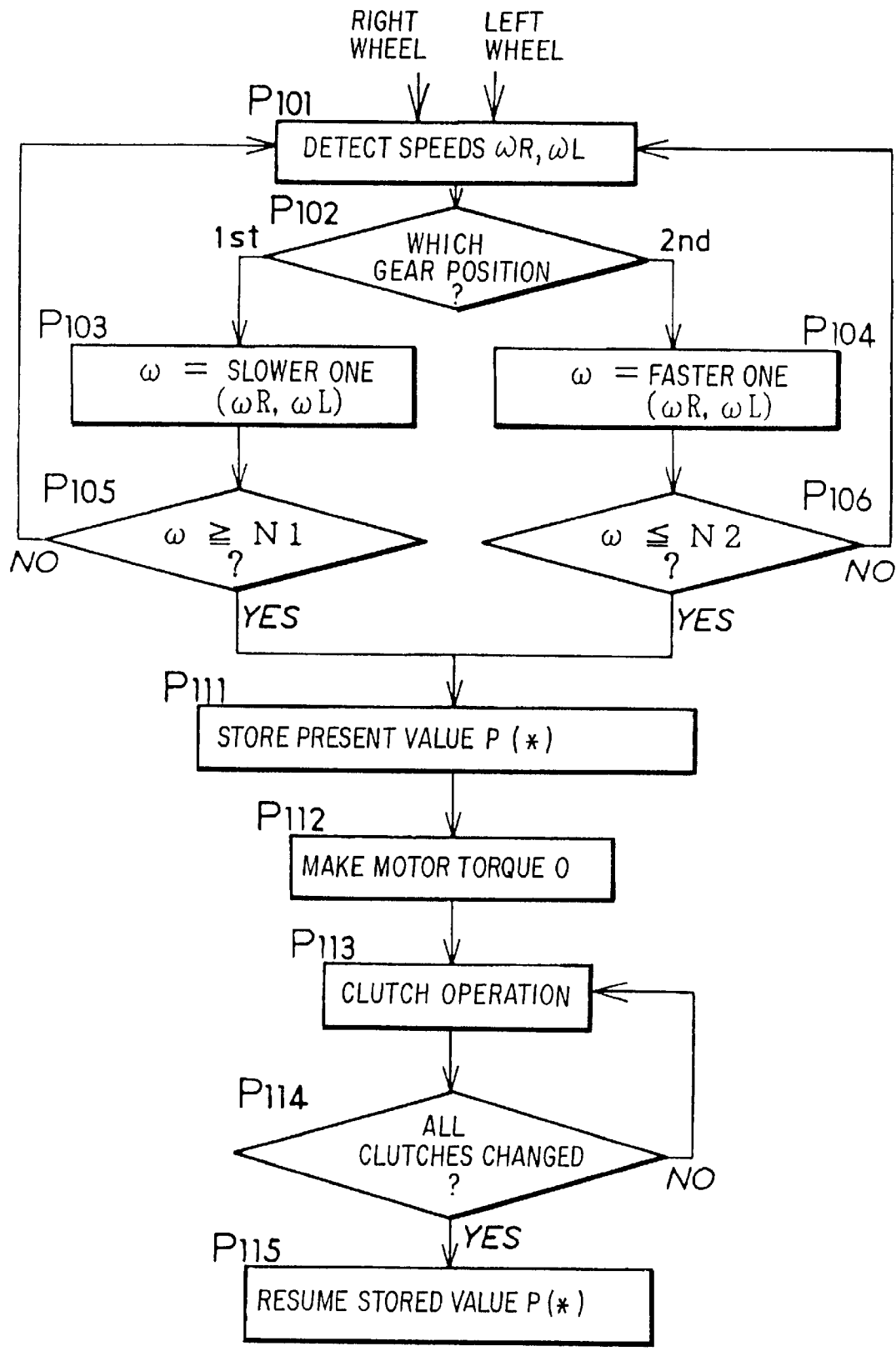
FIG. 6 is a flowchart for explaining the gear change operation control of a drive unit according to the second embodiment of the invention.

Specifically, in this embodiment, as shown in the flowchart of FIG. 6, in the first half steps P101 to P106 of the flowchart, it is judged whether or not the gear change shall be made by more accurately presuming the propelling speed of the vehicle, and in the second half steps P111 to P115, the same gear change operation as in the first embodiment is performed based on the judgment in the first half.

In step P101, propelling speeds $\omega R$, $\omega L$ are detected from the respective drive units 8 for driving the rear right and left wheels.

The process goes to step P102, where the current gear position is judged. When the gear position is in the first-speed position, the process goes to step P103, and when in the second-speed position, the process goes to step P104.

And, in step P103 that the gear position was judged to be in the first-speed position, the propelling speeds $\omega R$, $\omega L$ detected from the right and left drive units 8 are compared and judged, and a slower one is selected and processed as a propelling speed $\omega$. And, according to this selected propelling speed $\omega$, the gear change judgment is performed in the following step P105.

Specifically, when the detected propelling speeds $\omega R$, $\omega L$ are different from one another, one of them is an inappropriate value. And, when the gear position is to be shifted up from the first-speed position to the second-speed position, since the vehicle is often accelerating, it is highly possible that a propelling wheel revolves excessively and slips on a road surface during acceleration. Therefore, it is considered that the propelling wheel with a higher rotational speed has an inappropriate value, and the propelling wheel with a lower rotational speed is high in accuracy. Therefore, the propelling speed $\omega R$ or $\omega L$ with a lower rotational speed is selected as the actual vehicle's propelling speed $\omega$, and used in the following process. Thus, when the gear position is in the first-speed position and the detected propelling speeds $\omega R$, $\omega L$ are mutually different, a lower propelling speed is selected, and the process goes to step P105.

In step P104 where the gear position was judged to be in the second-speed position, the propelling speeds $\omega R$, $\omega L$ are compared, and a faster one is selected and processed as the propelling speed $\omega$. And, according to the selected propelling speed $\omega$, the gear change judgment is performed in P106.

Specifically, when the propelling speeds $\omega R$, $\omega L$ are different to each other and the gear position is to be shifted down from the second speed to the first speed, the vehicle is being decelerated by the braking operation, and it is highly possible that a propelling wheel can not properly contact to a ground surface and slips during deceleration. Therefore, it is considered that a propelling wheel having a lower rotational speed has an inappropriate value and a propelling wheel having a higher rotational speed is high in accuracy. And, the propelling speed with the higher rotational speed is selected as the actual vehicle's propelling speed and used in the following process. Thus, when the gear position is in the second-speed position and the detected propelling speeds R, L are mutually different, the higher propelling speed is selected, and the process goes to step P105.

In step P105, it is judged whether or not the selected propelling speed $\omega$ has reached the shift-up changing speed N1, and if it has reached, the process goes to the gear change in step P111 and following, but if not, the process returns to step P101.

And, in step P106, it is also judged whether or not the selected propelling speed $\omega$ has lowered to the shift-down changing speed N2, and if it has lowered, the process goes to the gear change in step P111 and following, but if not, the process returns to step P101.

As described above, in this embodiment, when the propelling speeds obtained from the respective drive units are different, an appropriate propelling speed is selected according to a traveling situation presumed from the gear position, and the gear change is performed according to the propelling speed. Therefore, accuracy of the gear change operation can be improved, and comfortable traveling performance can be obtained. In other words, when the low-speed gear position is to be changed to the high-speed gear position, it is considered that the vehicle is accelerating and a propelling wheel faster among the propelling wheels revolves excessively and slips, and a lower propelling speed is selected, and when the high-speed gear position is to be changed to the low-speed gear position, it is considered that the vehicle is decelerating and a propelling wheel with a lower revolution cannot properly contact to a ground surface and slips due to a wheel lock, and a faster traveling speed is selected.

And, in this embodiment, when the detected plurality of traveling speeds are different, the shift-up judgment is made according to a lower traveling speed, and the shift-down judgment is made according to a higher traveling speed. Therefore, at the time of judging the shift-up or shift-down, different standards are provided in the same way as in the first embodiment, so that the hysteresis property of the gear-change operation can be enhanced and secured.

The third embodiment of the invention will be described with reference to the flowchart shown in FIG. 7.

In this embodiment, in addition to the configuration in the second embodiment, the gear change operation to be made during the operation of the regeneration brake is canceled in order to keep the braking operation by the regeneration brake and to improve safety and braking performance.

Figure 7:
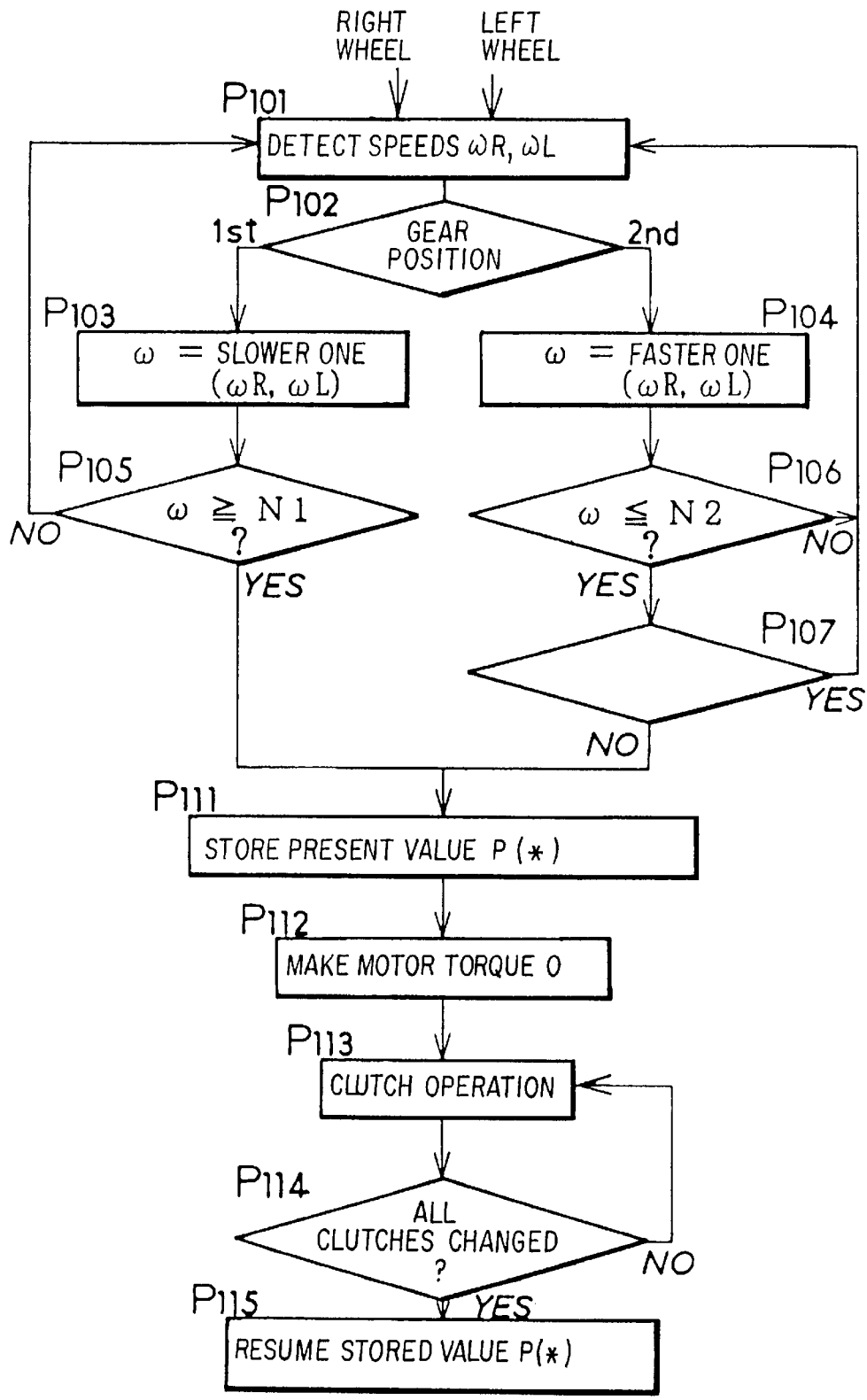
FIG. 7 is a flowchart for explaining the gear change operation control of a drive unit according to the third embodiment of the invention.

In the first half steps P101 to P107 of the flowchart shown in FIG. 7, it is judged whether or not the gear change shall be made by selecting an appropriate propelling wheel and presuming the accurate propelling speed of the vehicle, and the shift-down operation for the gear change is canceled when operating the regeneration brake; and in the second half steps P111 to P115, a prescribed gear change operation is performed based on the judgment in the first half.

When the regeneration brake is operated during the normal traveling, the traveling speed is lowered by the braking operation, so that the shift-down operation for the gear change is automatically performed depending on the speed range. Therefore, next to step P106 for judging the shift down, step P107 is provided to judge whether the regeneration brake is operating, and when it is judged in step P107 that the brake is operating, the process is returned to step P101, and the gear change operation in step P111 and following is canceled.

Specifically, in the drive unit 8 in this embodiment, the regeneration brake is used for the braking device. This regeneration brake temporarily uses the motor 7, which is connected to the propelling wheel through the transmission device 13, as a generator to convert the motion energy to be reduced for the vehicle into the electric energy, and recover it into the storage batteries. Therefore, when the gear change is performed while the regeneration brake is operating, the engagement of the propelling wheel and the motor 7 is temporarily released during the engagement or disengagement of the clutch, resulting in causing a duration that the regeneration brake cannot function. As a result, the braking distance of the vehicle by the regeneration brake becomes long, causing a disadvantage that sufficient safety cannot be secured. And, when the gear change operation is completed, the reduction ratio between the motor 7 and the propelling wheel is changed, so that the revolution speed of the motor 7 is different from the one before the gear change, and the generation by the motor 7 is changed, and the regeneration braking force is varied. Therefore, the effect of the regeneration brake by using the motor 7 is varied before and after the gear change.

Accordingly, in this embodiment, the gear change operation is canceled while the regeneration brake is operating to prevent such an inconvenient situation.

In this embodiment, in the same way as in the second embodiment, the gear change judging process is performed in steps P101 to P106.

In step P101, the propelling speeds ωR, ωL are detected from the respective drive units 8 for driving the rear right and left wheels 5, 5, and in step P102, the current gear position is identified. When the gear position is in the first-speed position, the process goes to step P103, and when it is in the second-speed position, the process goes to step P104.

And, in step P103 where the gear position is in the first-speed position, the traveling speeds ωR, ωL detected from the right and left drive units are compared, a slower one is selected because of the same reason as in the previous embodiment, the gear change judgment is performed in step P105 according to the selected traveling speed WR or ωL.

In step P105, it is judged whether or not the selected traveling speed ω has increased to the changing speed N1, and if it has increased, the process goes to the gear change performing process in step P111 and following, but if not, the process returns to step P101.

And, in step P104 where the gear position was judged to be in the second-speed position, the traveling speeds ωR, ωL are compared, and a faster one is selected because of the same reason as in the previous embodiment. And, the gear change judgment is performed in step P106 according to the selected traveling speed ω.

In step P106, it is judged whether or not the selected traveling speed ω has lowered to the changing speed N2, and if it has lowered, the process goes to step P107 and following, but if not, the process returns to step P101.

In step P107, it is judged whether or not the regeneration brake is operating, and if it is operating, the process returns to step P101, but if not operating, the process goes to step P111 and following, and the gear change is performed.

As described above, in this embodiment, the gear change operation is canceled while the regeneration brake is operating to keep the connected state of the motor and the drive wheel and to keep the regeneration brake operating, so that safety and brake performance can be improved. For example, when the gear change is performed while the regeneration brake is operating, the connection of the drive wheel and the motor is disengaged and the regeneration brake does not function, so that the braking distance of the vehicle becomes short, and the effectiveness of the regeneration brake may be varied while braking. Therefore, the gear change while the regeneration braking operation is prohibited, so that such disadvantages can be prevented from being occurred, the braking distance can be kept normal, and the effectiveness of the regeneration brake can be stabilized. For example, panic braking can be dealt with at the time of emergency, so that sufficient safety can be secured.

Figure 8:
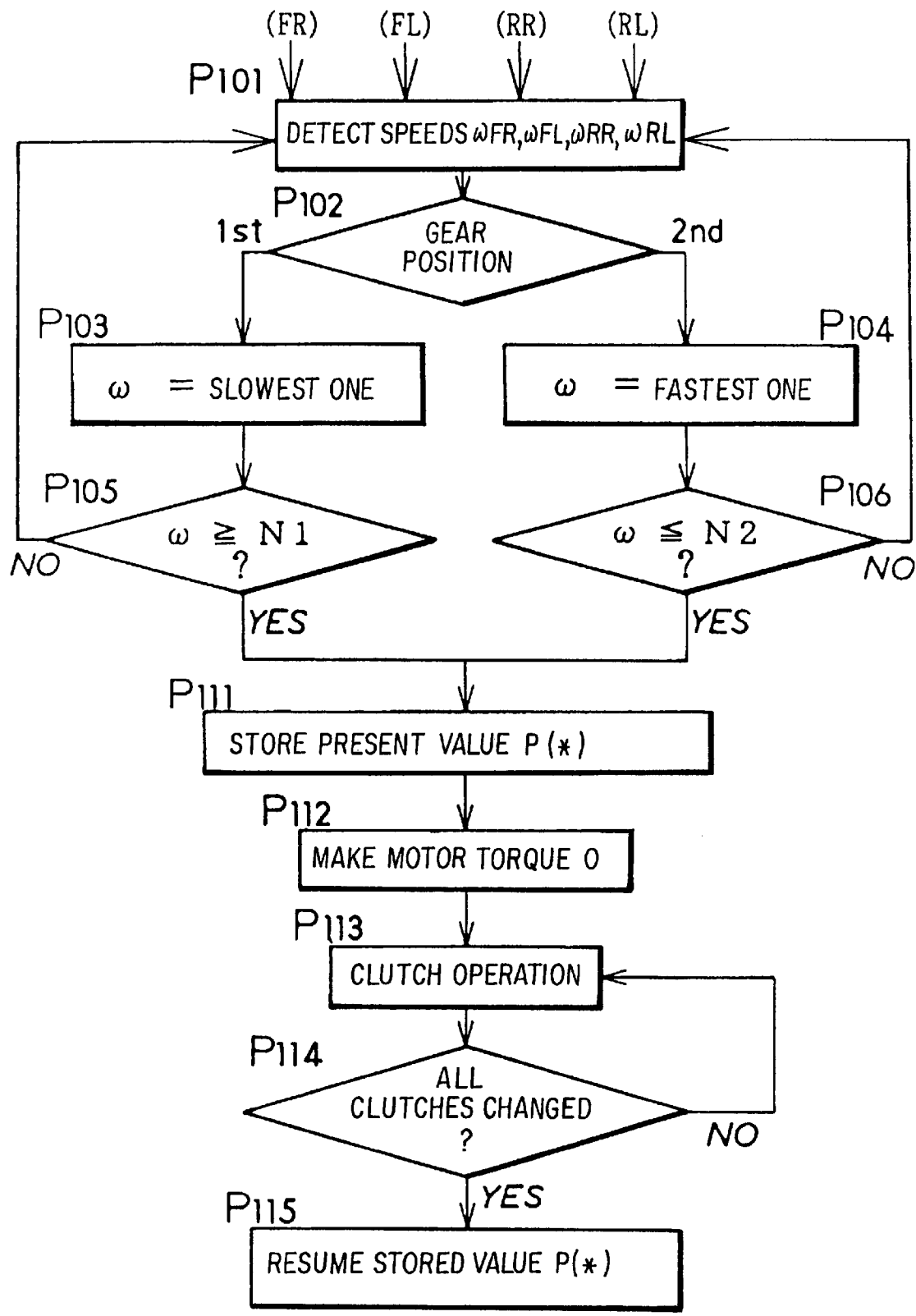
FIG. 8 is a flowchart for explaining the gear change operation control of a drive unit according to the fourth embodiment of the invention.

Furthermore, the fourth embodiment of the invention will be described with reference to the flowchart shown in FIG. 8.

In this embodiment, in addition to the same configuration as in the first embodiment, a rotational speed sensor is disposed for each of the front right and left wheels where the drive units are not provided, so that the rotational speeds of all four wheels of the vehicle are detected, and the accuracy of the gear change operation can be improved.

Specifically, the rear wheels 5, 5 having the drive units 8 are connected to the motors 7 through the transmission device 13 and have a higher chance of receiving the drive forces or brake force from the motors 7 as compared with the front wheels which are not connected to the motors 7, and have a higher probability of slipping on a road surface when accelerating or decelerating. Therefore, by providing the rotational speed sensors for detecting the rotational speeds of the propelling wheels for the front wheels 4 which do not have the drive units and by adding the traveling speeds obtained from the front wheels 4 by these rotational speed sensors to the gear change judgment, the accuracy of detecting the traveling speed can be improved, and the accurate gear change operation can be made.

Then, a method for controlling the drive units in this embodiment will be described with reference to the flowchart shown in FIG. 8. In the first half steps P101 to P106 in the flowchart, it is judged whether or not the gear change shall be performed by presuming the accurate traveling speed of the vehicle in view of the rotational speeds of the four wheels. In the second half steps P111 to P115, a prescribed gear change is performed based on the judgment in the first half.

In step P101, the current traveling speeds are respectively detected from the four propelling wheels, and the detected values are read into the integrated control circuit 27. Specifically, traveling speeds ωFR, ωFL are obtained from the respective speed sensors provided for the front right and left wheels 4, 4. At the same time, the rotational speeds of the respective motors 7 are detected from the speed sensors 7b disposed on the propelling motors 7 of the respective drive units 8, and the traveling speeds ωRL, ωRR are obtained.

In step P102, the current gear position is identified, and if it is in the first-speed position, the process goes to step P103, and if in the second-speed position, the process goes to the step P104.

And, in step P103, the detected traveling speeds ωFL, ωFR, ωRL, ωRR are compared for judgment, and the slowest one is selected and processed as the traveling speed ω because of the same reason as in the previous embodiment, and the gear change is judged in step P105 in view of the selected traveling speed ω.

In step P105, it is judged whether or not the selected traveling speed ω has increased to the shift-up change speed N1. And, if it has increased, the process goes to step P111 and the gear change for shifting up all drive units 8 is performed, but if not, the process returns to step P101.

On the other hand, in step P104, the detected traveling speeds ωFL, ωFR, ωRL, ωRR are compared for judgment, the fastest one is selected as the traveling speed ω because of the same reason as in the previous embodiment, and the gear change judgment is performed in step P106 in view of the selected traveling speed ω.

In step P106, it is judged whether or not the selected traveling speed ω has lowered to the changing speed N2. And, if it has lowered, the process goes to step P111 and following, and the gear change for shifting down all drive units 8 is performed, but if not, the process returns to step P101.

As described above, in this embodiment, the traveling speed of the vehicle at the moment is detected based on the propelling wheels provided with the drive units and the propelling wheels not provided with the drive units, and among the detected values, a detected value corresponding to the speed change situation is used for the gear change judgment, so that the accuracy of the gear change operation can be improved, and the vehicle can be traveled stably. In other words, since the number of speed detection data to be used for the gear change judgment is increased, inappropriate detection data due to at least some causes are selected, and a chance of controlling the judgment can be decreased. Therefore, since the accuracy of speed data can be enhanced, reliability of the gear change judgment can be improved, and the stable control operation can be made.

And, the drive wheels to which the driving force and braking force from the drive units are transmitted have high possibility of causing a slip particularly at the time of accelerating or decelerating, and an accurate traveling speed might not be obtained. On the other hand, it is presumed that the propelling wheels not provided with the drive units can keep the normal revolution without slipping even at accelerating or decelerating, so that a traveling speed with a relatively high reliability can be detected, and more accurate gear change judgment can be made.

Figure 9:
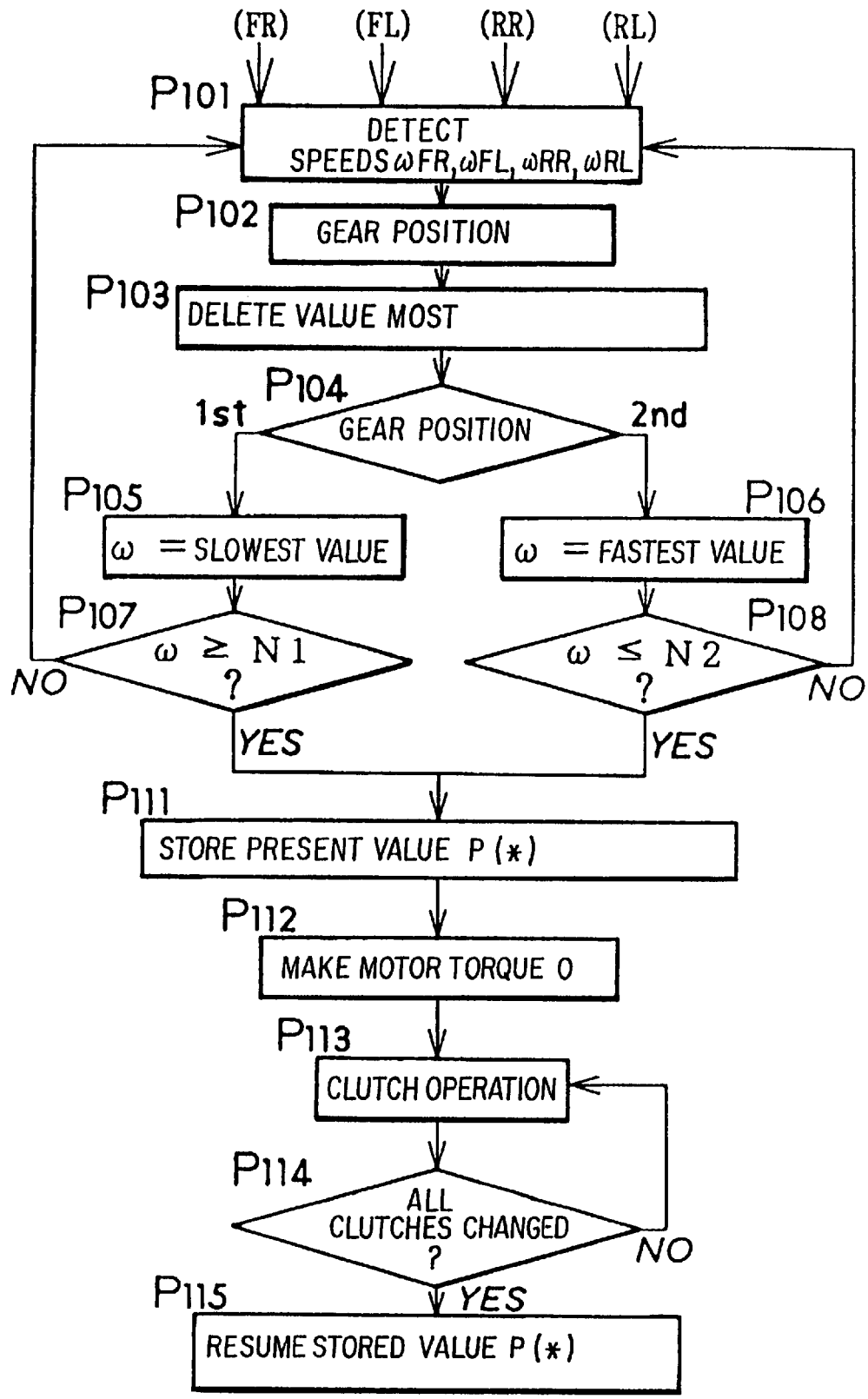
FIG. 9 is a flowchart for explaining the gear change operation control of a drive unit according to the fourth embodiment of the invention.

Now, the fifth embodiment of the invention will be described with reference to FIG. 9.

The drive unit 8 in this embodiment, in addition to the same configuration as in the fourth embodiment, detects the rotational speeds of all four wheels of the vehicle and performs a deleting process for deleting from the detected values a value most different from other detected values; and in the same way as in the second embodiment, selects an appropriate detected value according to the shift-up or shift-down situation from the remaining detected values, and performs the gear change judgment in view of the selected appropriate detected value, thereby improving the accuracy of the gear change operation.

Specifically, in this embodiment, the rotational speed sensors are provided for the front right and left wheels 4, 4 which are not provided with the drive units 8, and the rotational speeds of the respective front and rear wheels detected by the rotational speed sensors are read into the integrated control 27. And, an abnormal value is identified and deleted from the detected plurality of traveling speeds, and a value which is presumed to be nearest to the actual traveling speed is selected to make the gear change judgment. Namely, from the motor speed detected from each drive unit 8 and the rotational speed of each front wheel detected from the rotational speed sensor for each front and rear wheel, the vehicle's traveling speed is calculated, and from the average value of the traveling speeds, the most different value is deleted, then an appropriate detected value is selected according to the gear change judgment for shift-up or shift-down.

Now, a method for controlling the drive unit 8 in the electric vehicle 1 configured as described above will be described with reference to the flowchart shown in FIG. 9. In the first half steps P101 to P108 in the flowchart, it is judged whether or not the gear change shall be made by presuming an appropriate traveling speed of the vehicle from the rotational speeds of the four wheels, and in the second half steps Plll to P115, a prescribed gear change operation is performed based on the judgment in the first half.

In step P101, in the same way as in the fourth embodiment, the current traveling speeds are respectively detected from the four propelling wheels, and the detected traveling speeds ωFL, ωFR, ωRL, ωRR are read into the integrated control circuit 27.

In step P102, the average speed value ω0 is calculated from these traveling speeds ωFL, ωFR, ωRL, ωRR.

In step P103, among these detected traveling speeds ωFL, ωFR, ωRL, ωRR, a value most different from the calculated average speed value ω0 is deleted. Therefore, if one propelling wheel indicates an abnormal traveling speed with respect to the other propelling wheels due to some reason, such as being stuck in sand, this abnormal value can be deleted necessarily, and an error in the gear change judgment to be made in the next step can be prevented.

Then, in step P104, the current gear position is identified, and if it is in the first-speed position, the process goes to step P105, and if in the second-speed position, the process goes to step P106.

And, in step P105 after being identified that the gear position is in the first-speed position, these detected traveling speeds ωFL, ωFR, ωRL, ωRR are compared, and a slowest traveling speed ω is selected among them. In other words, the case of performing the gear change when the gear position is in the first-speed position means that the gear position is shifted up from the first-speed position to the second-speed position and the vehicle is accelerating, and during this acceleration, it is highly possible that the propelling wheels rotate excessively and slip on a road surface, and therefore, the slowest traveling speed ω is selected among these detected traveling speeds ωFL, ωFR, ωRL, ωRR. And, based on the selected traveling speed ω, the gear change judgment is performed in step P107.

In step P107, it is judged whether or not the selected traveling speed ω has increased to the shift-up changing speed N1, and if it has, the process goes to the gear change operation for shifting up in step P111 and following, but if not, the process returns to step P101.

And, in step P106 after being identified that the gear position is in the second-speed position, these detected traveling speeds ωFL, ωFR, ωRL, ωRR are compared, and a fastest traveling speed ω is selected among them. In other words, the case of performing the gear change when the gear position is in the second-speed position means that the gear position is shifted down from the second-speed position to the first-speed position and the vehicle is decelerating, and during this deceleration, it is highly possible that the propelling wheels cannot properly contact to a ground surface and slip due to a wheel lock, and therefore, the fastest traveling speed ω is selected among these detected traveling speeds ωFL, ωFR, ωRL, ωRR. And, based on the selected traveling speed ω, the gear change judgment is performed in step P107.

In step P108, it is judged whether or not the traveling speed has lowered to the shift-down changing speed N2, and if it has, the process goes to step P111 and following, and the gear change operation for shifting down is performed, but if not, the process returns to step P101.

As described above, this embodiment provides the same effects as in the fourth embodiment, and since the most different abnormal value from the average value is deleted from the traveling speed data obtained from the four propelling wheels, even when one of the propelling wheels is excessively deviated from the normal revolving state due to some situation or reason, the abnormal traveling speed value based on such a propelling wheel is deleted, the gear change judgment based on the abnormal value is prevented, and the reliability in speed detection can be improved. And, after deleting the abnormal value, according to the traveling situation in which the vehicle is shifted up or down, the most reliable value which is presumed not based on the slipping wheel is selected, and the gear change judgment can be made. As a result, the accurate gear change judgment can be performed, and the vehicle's traveling performance and safety can be improved further.

Now, the sixth embodiment of the invention will be described with reference to FIG. 10.

In this embodiment, the drive unit 8 is provided with a structure of performing the manual speed change by the driver as desired in addition to the same automatic speed change operation as in the first embodiment.

Figure 10:
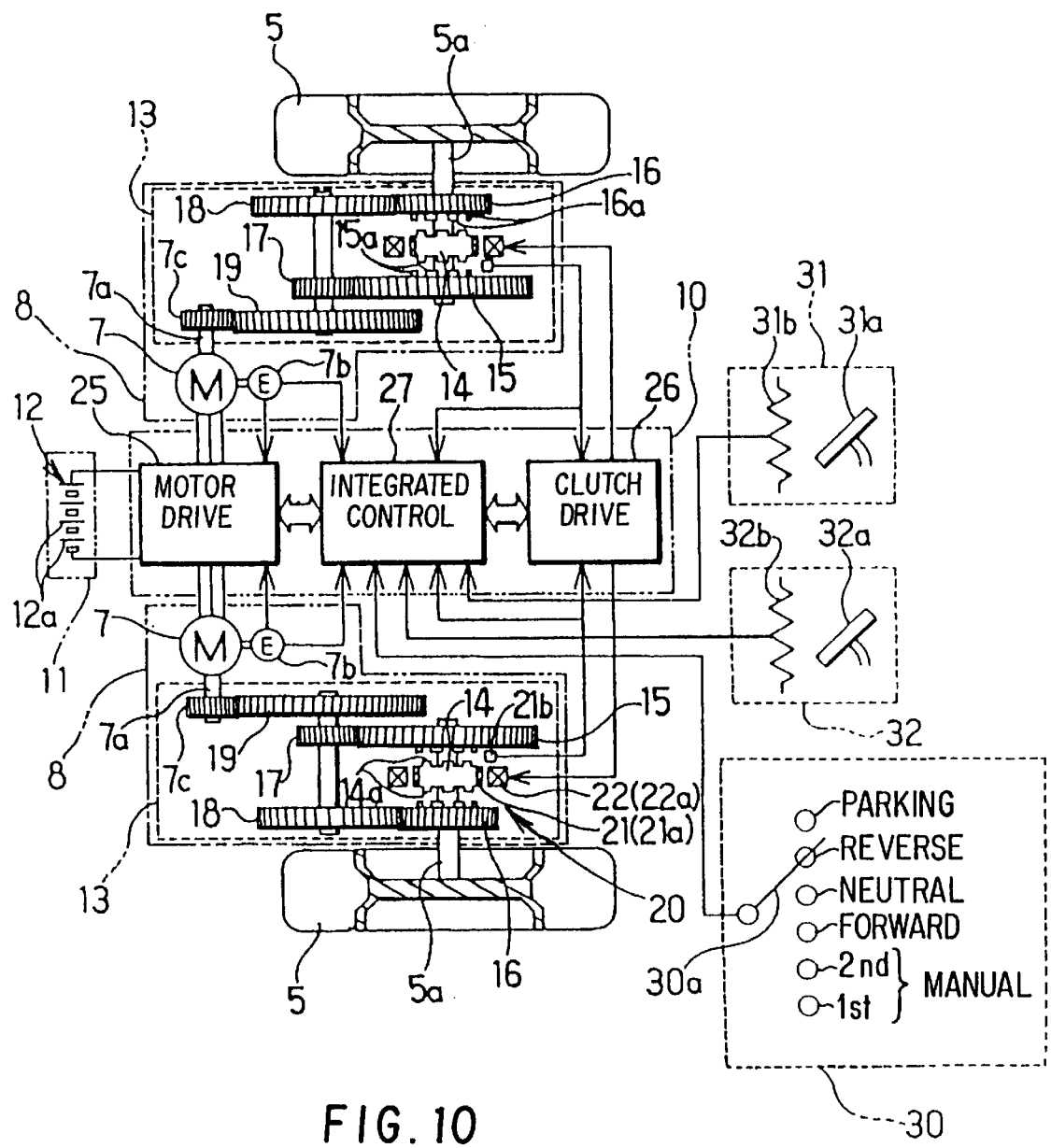
FIG. 10 is a circuit block diagram for explaining the whole configuration of the electric vehicle according to the sixth embodiment of the invention.

Specifically, the electric vehicle 1 of this embodiment has the travel selection unit 30 which is provided with the manual operation mode of selecting the first speed or second speed by the driver's operation when traveling in addition to the above-described automatic gear change mode as shown in FIG. 10. And, the driver can perform a desired gear change operation in the manual gear change mode.

The selection position of the travel selection unit 30 is further provided with the 2nd and 1st for the manual operation mode in addition to Parking, Reverse, Neutral and Forward for the automatic gear change mode.

The neutral is a state that the dog clutch 14 in the transmission device 13 provided in each drive unit 8 is independent of the first-speed revolution gear 15 and the second-speed revolution gear 16.

In this embodiment, during the manual operation such as the 2nd or 1st, the gear change operation can be made immediately by the driver's operation without being interfered by control or the like. Therefore, the driver's intention can be securely incorporated into the speed change operation of the transmission device 13.

Besides, differing from the above-described embodiments, in the manual mode gear change operation, when a certain drive unit 8 completes the gear change, an output instruction value is sent to the propelling motor 7 in the drive unit 8.

Therefore, even when the drive torque of a certain drive unit 8 cannot be transmitted because the clutch in the drive unit 8 is engaged too hard to be disengaged, the clutch teeth are broken and not engaged, or the drive coil is burnt and the clutch changing operation cannot be made, the vehicle can temporarily travel by the other operable drive unit 8.

And, regardless of the manual mode, namely in both traveling modes, the control is structured that to start the vehicle from its stopped state, when a single drive unit 8 completes the clutch connection, the output operation is immediately made from the pertinent drive unit 8. Therefore, by the drive force of the connected drive unit 8, the vehicle is moved even slightly, a revolution difference is produced between the connecting and connected clutches in the other unconnected drive unit 8 to facilitate the engagement of the clutches, and the prompt start can be made and the clutch connecting performance at start can be improved. Specifically, the first-speed/second-speed revolution gears 15, 16 connected to the motor 7 which is not operating to output are not operating, and when the vehicle moves even slightly, the dog clutch 14 which is directly connected to the revolving propelling wheel is also revolved even slightly, resulting in producing a revolution difference between them.

As described above, since the manual operation mode is added to the automatic gear change mode in this embodiment, the driver's intention can be surely incorporated into the gear change operation in this manual operation mode, so that the driver can enjoy the drive feeling, and the sport driving can be dealt with. And, when the automatic speed-change mode is not in a good condition in view of its program software or function or cannot conform with a traveling circumstance, the manual mode can deal with it.

And, in this manual gear change operation, when a certain single drive unit completes the gear change, the output operation is immediately made from the pertinent drive unit, so that even when the clutch operation in the other drive unit can not be made and the motor drive force cannot be transmitted, the vehicle can temporarily travel by the drive unit which can operate normally. In other words, when at least one drive unit can operate, the vehicle can be prevented from completely loosing its traveling function, and safety can be improved.

Besides, regardless of the manual mode, when the vehicle starts from its stopped state and a certain single drive unit completes the clutch connection, the starting performance and clutch connecting performance of the vehicle can be improved because the output operation is made from the pertinent drive unit. In other words, when the vehicle is moved even slightly, the propelling wheel to which the other drive unit with unconnected clutch is connected is also revolved, and since the motor of this drive unit is not operating, a revolution difference is produced between the connecting and connected clutches which are connected thereto to facilitate the engagement of the clutches.

Now, the seventh embodiment of the invention will be described with reference to the flowchart shown in FIG. 11.

In this embodiment, when the regeneration brake is operated and the propelling wheels are locked due to the regeneration braking force which becomes excessive owing to the traveling situation, control is made to reduce the braking level of the regeneration brake to release the wheel lock and to prevent the occurrence of a slip. Specifically, since a frictional force applied between the wheels and a road surface is variable depending on a worn level of tires and road conditions due to weather, the wheels are locked As described above, in this embodiment, it is detected that the motor output torque instruction value does not conform with the actual motor torque output value which is presumed from the motor consumption electric current to judge that the wheel slip has occurred, so that the slip can be judged sensorless without using a dedicated slip detecting device. Thus, the cost can be lowered and the running reliability can be improved. And, the invention can be applied to the conventional vehicle without adding a dedicated device/circuit, and used extensively.

Specifically, when the normal adhesion of the propelling wheels to the road surface is degraded because the wheel slips when the vehicle is started and accelerated or when the road surface conditions are changed during the travel at a constant speed, the relation between the output torque actually produced from the motor connected to the propelling wheel and the motor output instruction value is deteriorated, so that the judgment can be made with reliability.

And, in addition to the slip due to the operation error by the driver or the running environment conditions, the judgment can be on a slip due to a trouble in the power supply system or control circuit system, and safety can be improved. Besides, in case of troubles in both systems at the same time or a failure due to the combined cause resulting from the simultaneous malfunction of the systems, judgment can be made, and safety can be secured with higher reliability.

What is claimed is:

1. A drive for an electric vehicle, comprising:
   (a) a plurality of drive units, each drive unit comprising:
      (1) a transmission having an electromagnetic clutch and having a low-speed gear and a high-speed gear;
      (2) a single propelling motor interconnected with said transmission, which in turn is interconnected with a drive wheel, and
      (3) a traveling speed detecting sensor provided on said drive unit for providing a revolution signal, and
   (b) control means for separately controlling said respective drive units when no gear change is made but, when shift-up or shift-down gear change is made, simultaneously controlling said respective drive units according to one of revolution signals from traveling speed detecting means sensors.

2. A drive for the electric vehicle according to claim 1, which further comprises means for selecting a slowest revolution signal among said revolution signals from said traveling speed detecting sensors as said one of revolution signals when said shift-up gear change is made and a fastest revolution signal among said revolution signals as said one of revolution signals when said shift-down gear change is made to thereby maximize accuracy of a speed change operation.

3. A drive for the electric vehicle according to claim 1, which further comprises brake operation detecting means for detecting operation of a brake to provide a brake operation signal such that when said brake operation signal is sent to said control means, said control means cancels said shift-down gear change to maximize safety and braking performance.

4. A drive for the electric vehicle according to claim 1, which further comprises:
   a plurality of wheels which are not interconnected to drive units; and
   a speed sensor provided on each of said wheels so that said respective drive units are simultaneously controlled by a signal from one of said speed sensors and said traveling speed detecting sensors for greater accuracy.

5. A drive for the electric vehicle according to claim 4, which further comprises:
   calculating means for calculating an average value of speed information from said speed sensors and traveling speed detecting sensors, and
   speed comparing means for comparing the average value obtained by said calculating means with speed information from said respective speed sensors and said traveling speed detecting sensors and deleting a value most different from the average value of speed information to maximize accuracy of the gear change operation.

6. A drive for the electric vehicle according to claim 1, wherein said each drive unit further comprises:
   motor consumption electric current means for detecting an electric current consumed by said propelling motor,
   motor speed detecting means for detecting the number of revolutions of said propelling motor, and
   comparing and judging means for comparing said detected electric current and the number of revolutions and making judgment, so that when it is judged by said comparing and judging means that said drive wheel is slipping, said revolution signal from the traveling speed detecting sensor is canceled to thereby maximize reliability of the drive.

7. A drive for the electric vehicle according to claim 1, which further comprises selection means for enabling selection of an automatic speed change mode or a manual operation mode for said gear change by said transmissions of said drive units.

8. A method for controlling an electric vehicle comprising the steps of:
   combining a single propelling motor with a transmission having a low-speed gear and a high-speed gear to form a drive unit;
   providing a plurality of such drive units;
   respectively interconnecting said drive units with a plurality of drive wheels, one drive unit for each drive wheel, separately controlling said drive units according to an instruction signal from a control, making an output torque of each propelling motor substantially zero during gear change between said low-speed and high-speed gears of each transmission, and producing again the output torque of said each propelling motor after completing the gear change to thereby not only prevent a shock at a time of said gear change but also keep traction balance of said electric vehicle.

9. A method for controlling an electric vehicle according to claim 8, wherein said gear change includes a gear change by a manual operation and when said gear change in one drive unit has been completed in said manual operation, the output torque of the propelling motor of that particular drive unit is produced regardless of other drive units.

10. A method for controlling an electric vehicle according to claim 8, wherein when the vehicle is still and said gear change in one drive unit has been completed, the output torque of the motor of that particular drive unit is produced regardless of other drive units.

11. A method for controlling an electric vehicle according to claim 8, wherein a speed difference is provided between claw gears in order to make the gear change.

12. A drive for an electric vehicle, comprising:

(a) a plurality of drive units, each drive unit comprising:

(1) a transmission having an electromagnetic clutch;
(2) a single propelling motor interconnected with said transmission, which in turn is interconnected with a drive wheel, and
(3) a traveling speed detecting sensor for detecting a speed of that particular drive unit and (b) regeneration braking means for feeding back to batteries, when said drive wheel is not driven during running, power generated by rotation of said propelling motor which is driven by rotation of said drive wheel, and (c) control means for memorizing a revolution speed of said drive wheel detected by said traveling speed detecting sensor, comparing said memorized revolution speed and a present revolution speed and generating a signal when said present revolution speed is smaller than a revolution speed expected from normal braking by said regenerating braking means, by more than a predetermined value, wherein regenerating braking operation by said regenerating braking means is canceled when said signal from said control means is generated during said regenerating braking operation, thereby preventing wheel lock conditions.

* * * * *